US006614408B1

(12) United States Patent
Mann

(10) Patent No.: US 6,614,408 B1
(45) Date of Patent: Sep. 2, 2003

(54) EYE-TAP FOR ELECTRONIC NEWSGATHERING, DOCUMENTARY VIDEO, PHOTOJOURNALISM, AND PERSONAL SAFETY

(76) Inventor: W. Stephen G. Mann, N1NLF, University of Toronto, Dept. Of ECE., 10 King's College Road Room 2001, Toronto, Ontario (CA), M5S 3O4

( * ) Notice: Subject to any disclaimer, the term of this patent is extended or adjusted under 35 U.S.C. 154(b) by 0 days.

(21) Appl. No.: 09/275,775

(22) Filed: Mar. 25, 1999

Related U.S. Application Data

(63) Continuation-in-part of application No. 09/172,599, filed on Oct. 15, 1998.

(30) Foreign Application Priority Data

Mar. 25, 1998 (CA) .............................................. 2233.047
Apr. 14, 1998 (CA) .............................................. 2235.030

(51) Int. Cl.[7] ................................................ G09G 5/00
(52) U.S. Cl. .................................... 345/8; 345/7; 345/9
(58) Field of Search ....................... 348/333.01–333.13, 348/115, 207, 211, 335, 341; 345/7, 8, 9

(56) References Cited

U.S. PATENT DOCUMENTS

| 3,697,154 A | 10/1972 | Johnson ....................... 350/174 |
| 3,833,300 A | 9/1974 | Rymes ......................... 356/13 |
| 4,081,209 A | 3/1978 | Heller et al. ................. 350/174 |
| 4,220,400 A | 9/1980 | Vizenor ....................... 350/174 |
| 4,516,157 A | 5/1985 | Campbell ..................... 358/108 |

(List continued on next page.)

FOREIGN PATENT DOCUMENTS

| DE | 92 17 643 | 6/1993 |
| DE | 44 36 528 | 4/1996 |
| DE | 195 47 166 | 6/1996 |
| EP | 0 665 686 | 8/1995 |
| EP | 0 827 337 | 3/1998 |

(List continued on next page.)

OTHER PUBLICATIONS

Steve Mann, "'Pencigraphy' with AGC: Joint Parameter Estimation in Both Domain and Range of Functions in same Orbit of the Projective–Wyckoff Group"; MIT Media Laboratory; IEEE International Conference on Image Processing (ICIP–96), Sep. 16–19, 1996, Lausanne, Switzerland.

(List continued on next page.)

Primary Examiner—Vijay Shankar

(57) ABSTRACT

A novel system for a new kind of electronic news gathering and videography is described. In particular, a camera that captures light passing through the center of a lens of an eye of the user is described. Such an electronic newsgathering system allows the eye itself to, in effect, function as a camera. In wearable embodiments of the invention, a journalist wearing the apparatus becomes, after adaptation, an entity that seeks, without conscious thought or effort, an optimal point of vantage and camera orientation. Moreover, the journalist can easily become part of a human intelligence network, and draw upon the intellectual resources and technical photographic skills of a large community. Because of the journalist's ability to constantly see the world through the apparatus of the invention, which may also function as an image enhancement device, the apparatus behaves as a true extension of the journalist's mind and body, giving rise to a new genre of documentary video. In this way, it functions as a seamless communications medium that uses a reality-based user-interface.

43 Claims, 19 Drawing Sheets

SYSTEM ARCHITECTURE

U.S. PATENT DOCUMENTS

| | | | |
|---|---|---|---|
| 4,636,866 A | 1/1987 | Hattori | 358/236 |
| 4,649,434 A | 3/1987 | Weinblatt | 358/250 |
| 4,786,966 A | 11/1988 | Hanson et al. | 358/108 |
| 4,806,011 A | 2/1989 | Bettinger | 351/158 |
| 5,095,326 A | 3/1992 | Nozaki et al. | 354/222 |
| 5,189,512 A | 2/1993 | Cameron et al. | 358/93 |
| 5,323,264 A | 6/1994 | Kato | 359/432 |
| 5,331,333 A | 7/1994 | Tagawa et al. | 345/7 |
| 5,422,653 A | 6/1995 | Maguire, Jr. | 345/9 |
| 5,486,701 A | 1/1996 | Norton et al. | 350/372 |
| 5,546,099 A | 8/1996 | Quint et al. | 345/8 |
| 5,550,585 A | 8/1996 | Cherri | 348/207 |
| 5,570,156 A | 10/1996 | Arai et al. | 396/51 |
| 5,610,678 A | 3/1997 | Tsuboi et al. | 396/373 |
| 5,640,211 A | 6/1997 | Kawano et al. | 348/663 |
| 5,640,221 A | 6/1997 | Ishikawa et al. | 351/221 |
| 5,664,244 A | 9/1997 | Yamanura et al. | 396/296 |
| 5,692,227 A | 11/1997 | Yokota et al. | 396/377 |
| 5,708,449 A | 1/1998 | Heacock et al. | 345/8 |
| 5,777,715 A | 7/1998 | Kruegle et al. | 351/158 |
| 5,815,741 A | 9/1998 | Okuyama et al. | 396/51 |
| 5,828,793 A | 10/1998 | Mann | 382/284 |
| 5,856,844 A | 1/1999 | Batterman et al. | 348/207 |
| 6,005,536 A | 12/1999 | Beadles et al. | 345/7 |
| 6,043,799 A | 3/2000 | Tidwell | 345/7 |
| 6,045,229 A | 4/2000 | Tachi et al. | 353/28 |
| 6,046,712 A | 4/2000 | Beller et al. | 348/8 |
| 6,057,966 A | 5/2000 | Carroll et al. | 359/630 |
| 6,307,526 B1 * | 10/2001 | Mann | 345/8 |

FOREIGN PATENT DOCUMENTS

| | | |
|---|---|---|
| JP | 7-199278 | 8/1995 |
| JP | 8-179223 | 7/1996 |
| WO | WO 94 26061 | 11/1994 |
| WO | WO 96 14641 | 5/1996 |
| WO | WO 96 36271 | 11/1996 |
| WO | WO 97 34411 | 9/1997 |

OTHER PUBLICATIONS

Steve Mann; "Mediated Reality", Dec. 1994, MIT–D151–383; MIT–ML Percom TR–260, 1994.

English translation of Abstract from DE 92 17 643, Ronald Siwoff, "Video Glasses", Jun. 3, 1993.

English translation of Abstract from DE 44 36 528, Lixfeld, Wolf–Dieter, "Optical Enlarger for Mechanical and Medical Application", Apr. 25, 1996.

"Wearable Computing: A First Step Toward Personal Imaging" by Steve Mann, IEEE *Computer*, vol.30, No. 2, Feb. 1, 1997, pp. 25–32, XP000722152.

Patent Abstracts of Japan, vol. 096, No. 011, Nov. 29, 1996 (concerning JP08179223A, Jul. 12, 1996).

Augmenting Real–World Objects: A Paper–Based Audio Notebook by Lisa L. Stifelman, CHI' 96 pp. 199–200.

* cited by examiner

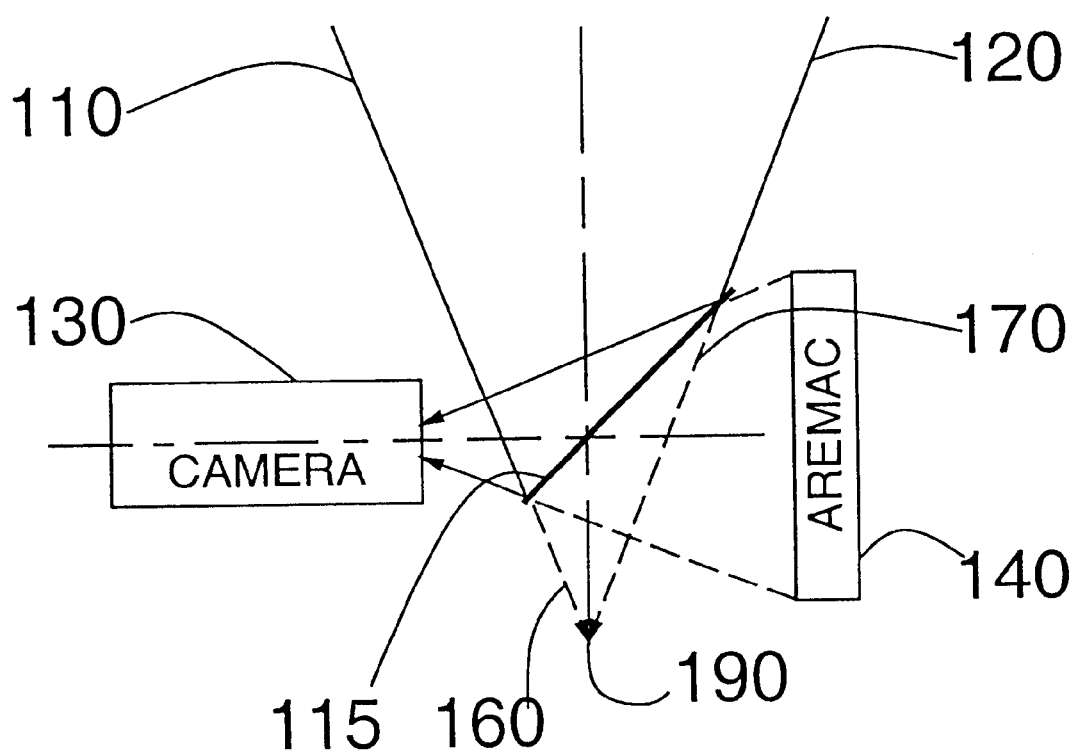
FIG. 1a – EYE-TAP CAMERA

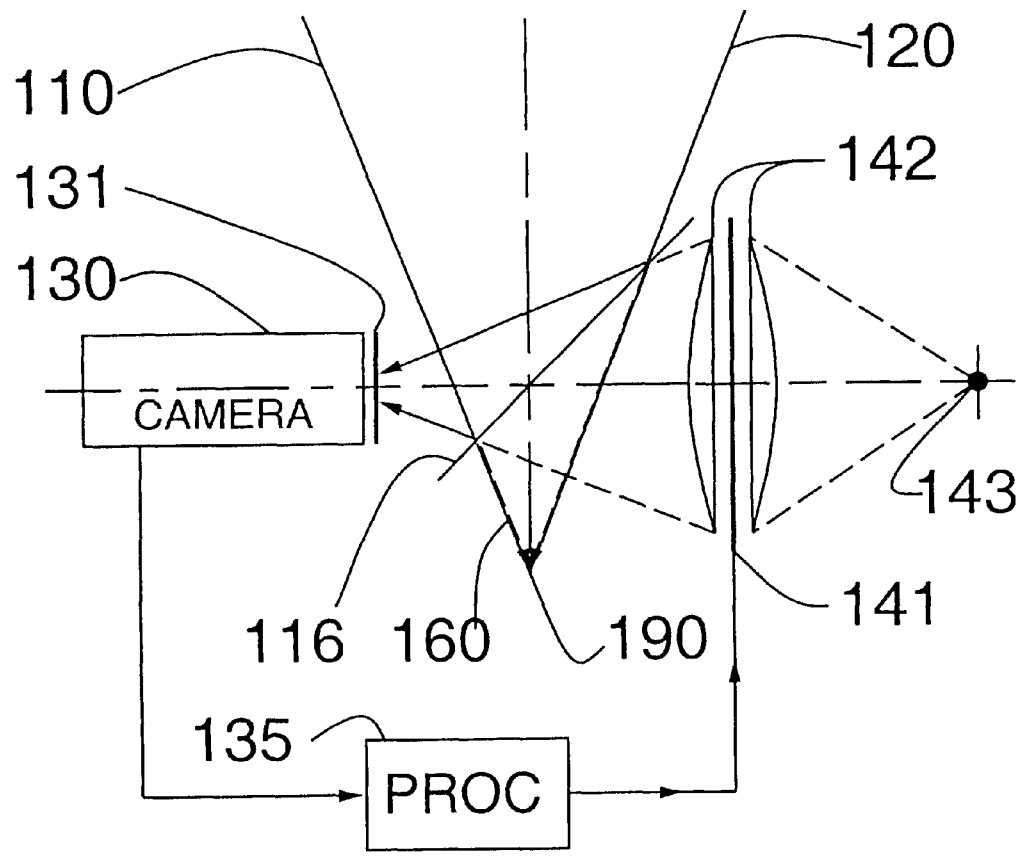
FIG. 1b – EYE-TAP CAMERA
WITH INFINITE DEPTH OF FIELD

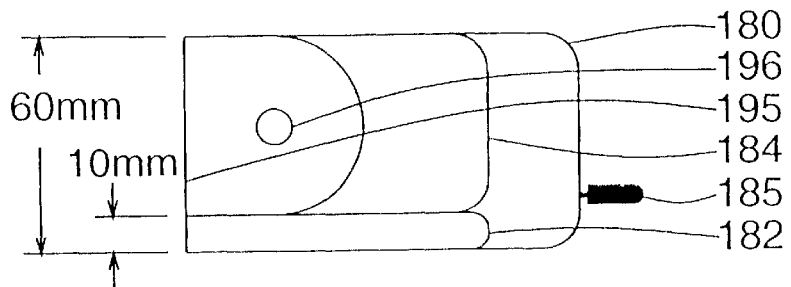
FIG. 1c – NEWSGATHERING PHONE FOLDED
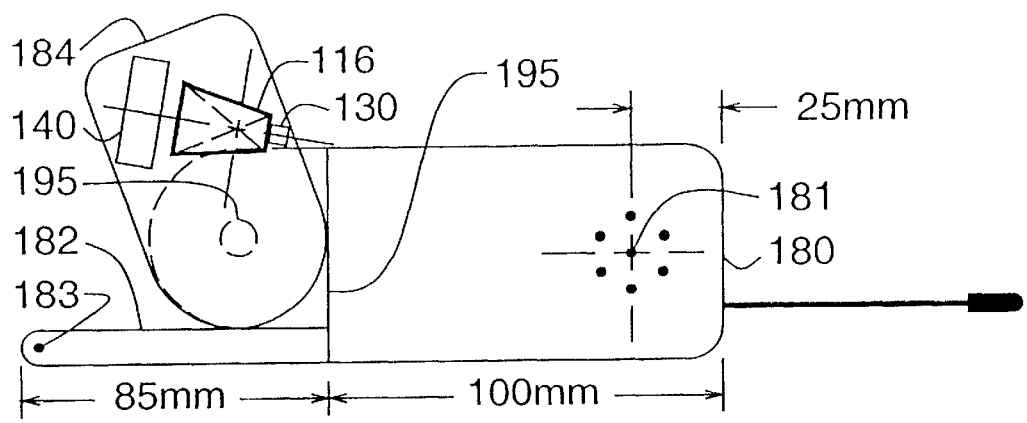
FIG. 1d – NEWSGATHERING PHONE OPEN
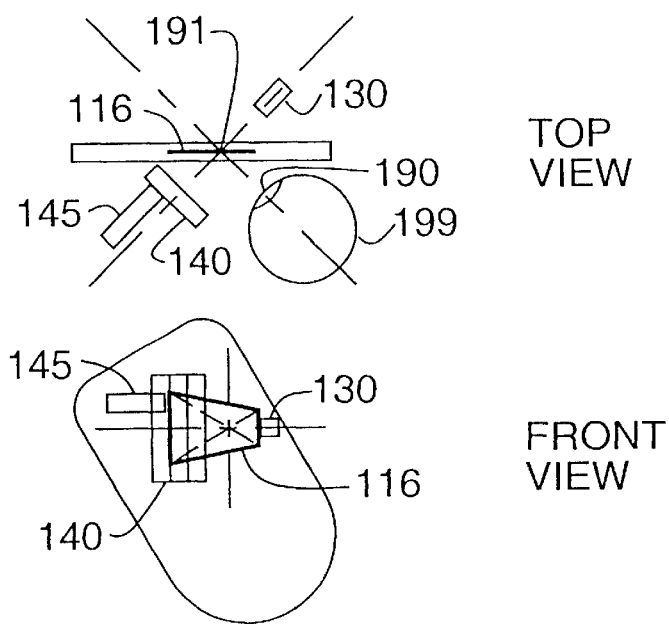
TOP VIEW
FRONT VIEW
FIG. 1e – NEWSGATHERING PHONE DETAIL

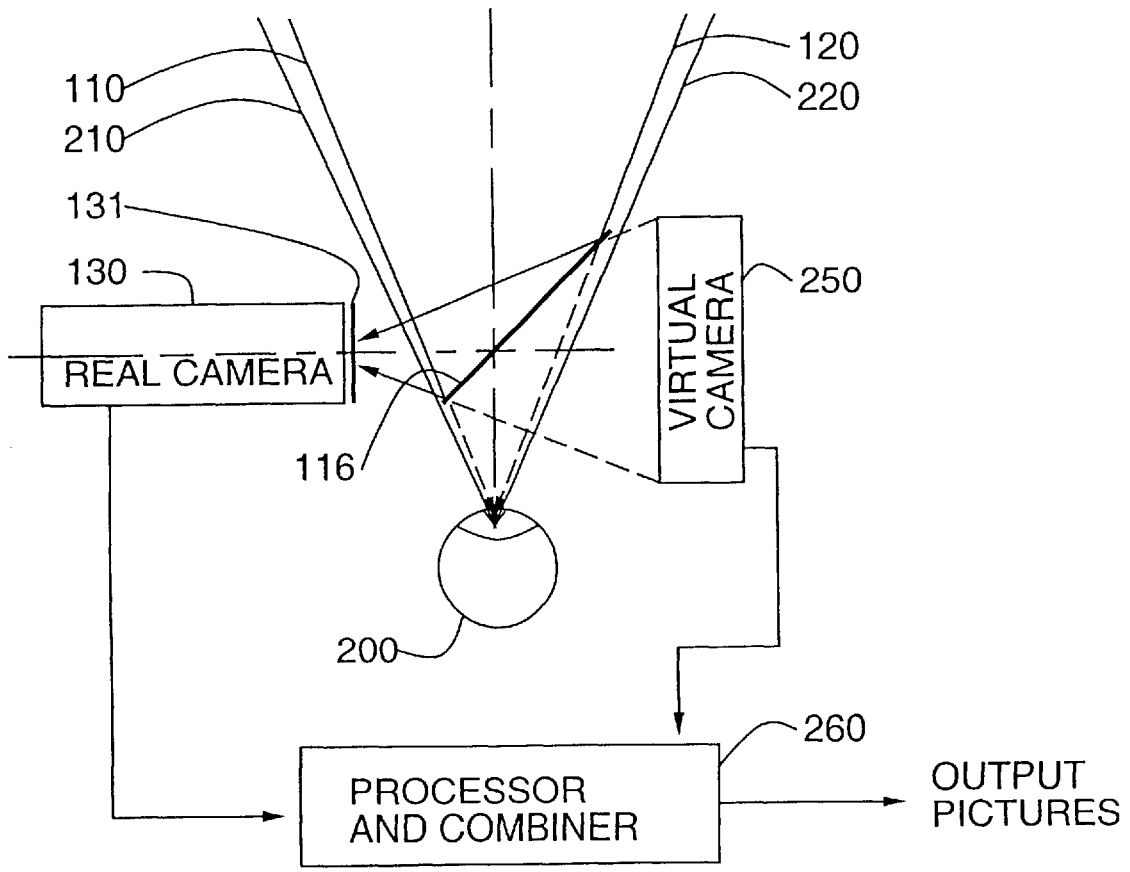
FIG. 2a – EYE-TAP CAMERA WITH FORENSIC OR EYE CONTROL

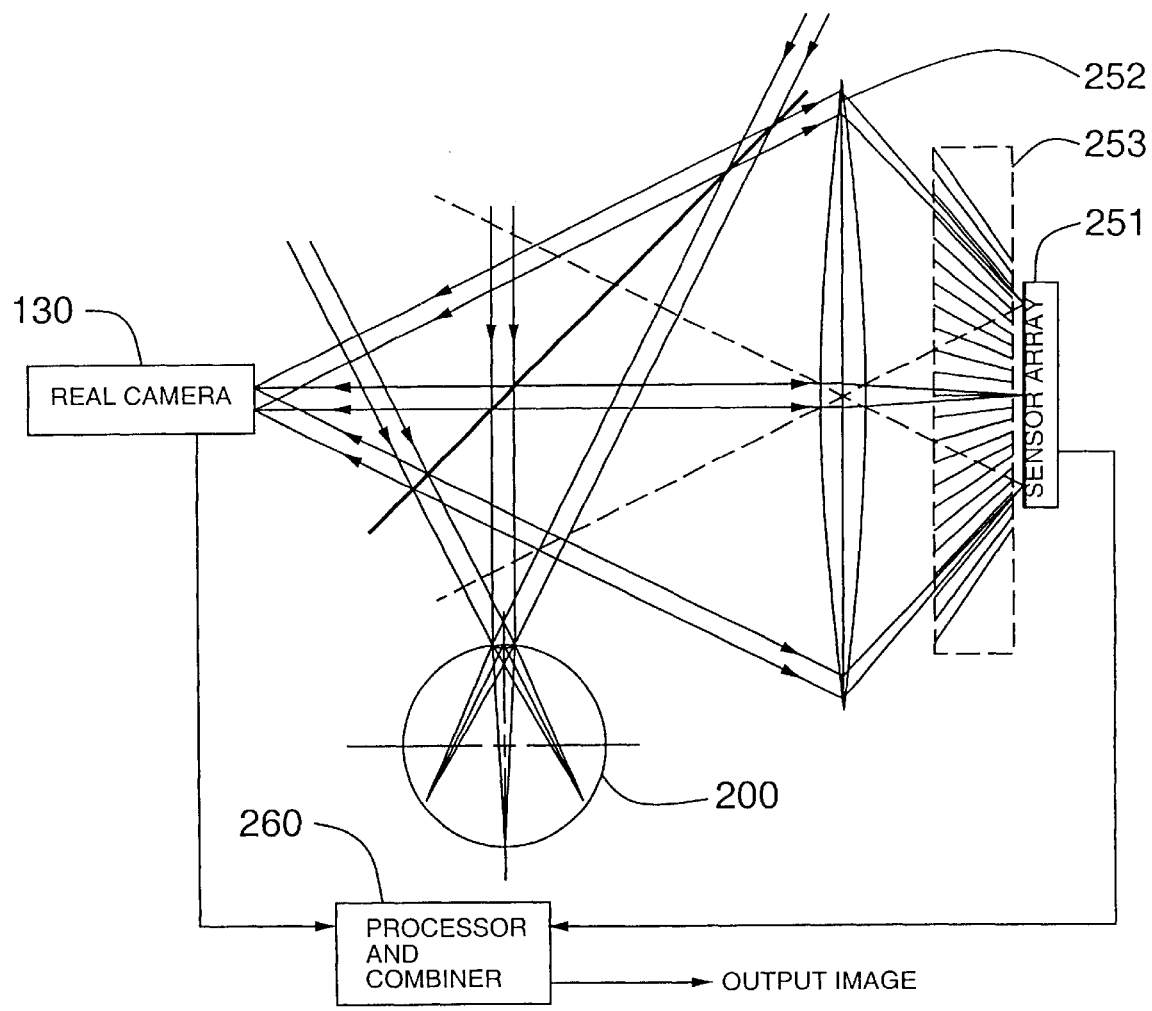
FIG 2b – EYE-CAMERA

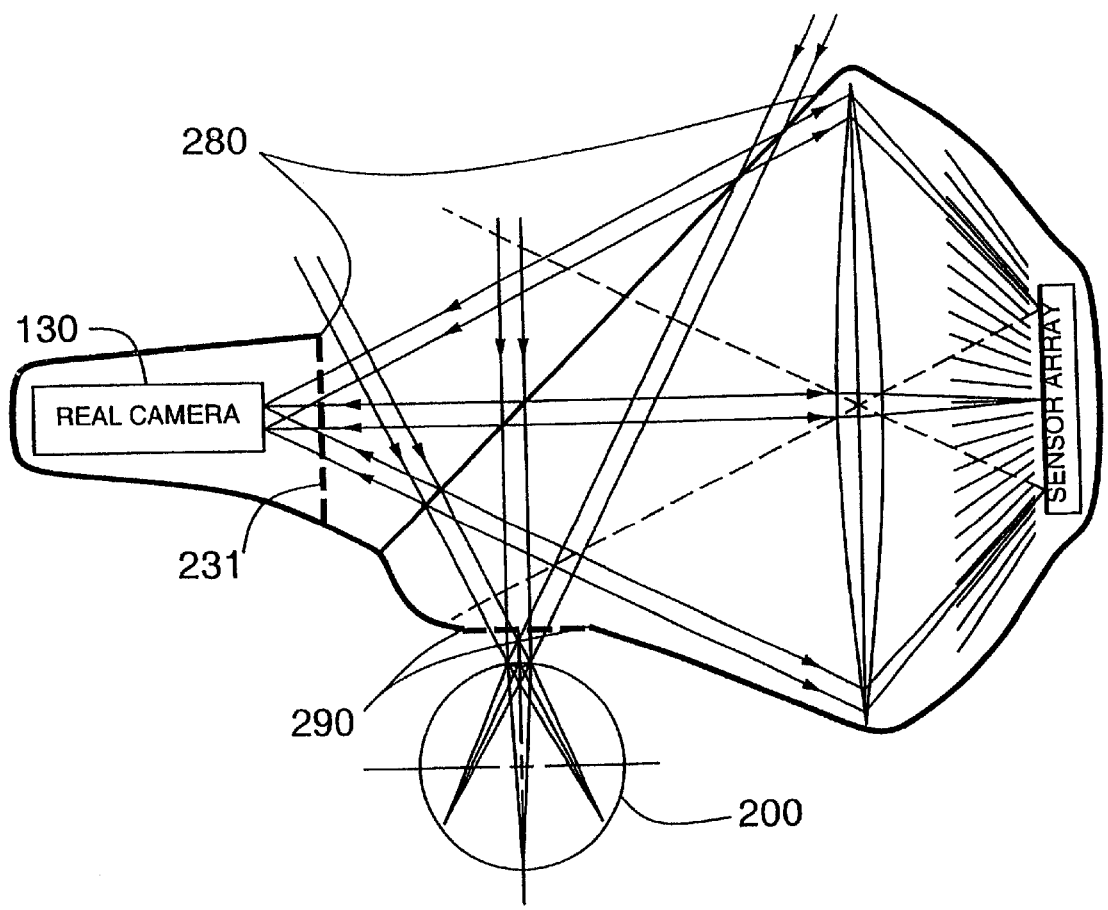
FIG 2c – HOUSING FOR EYE-CAMERA

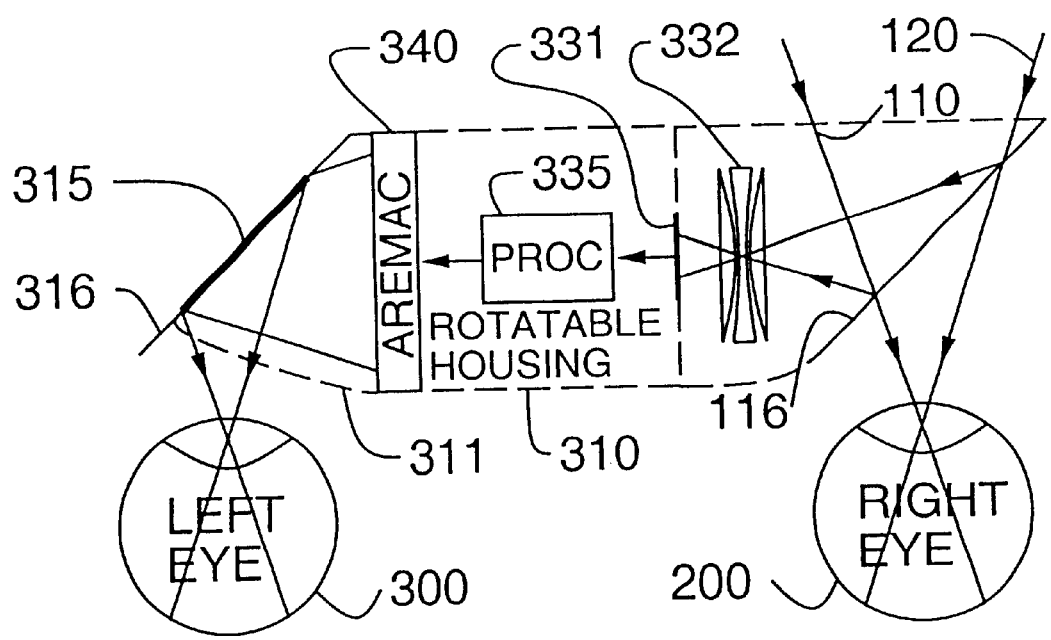
FIG. 3a – CROSSEYE-TAP CAMERA

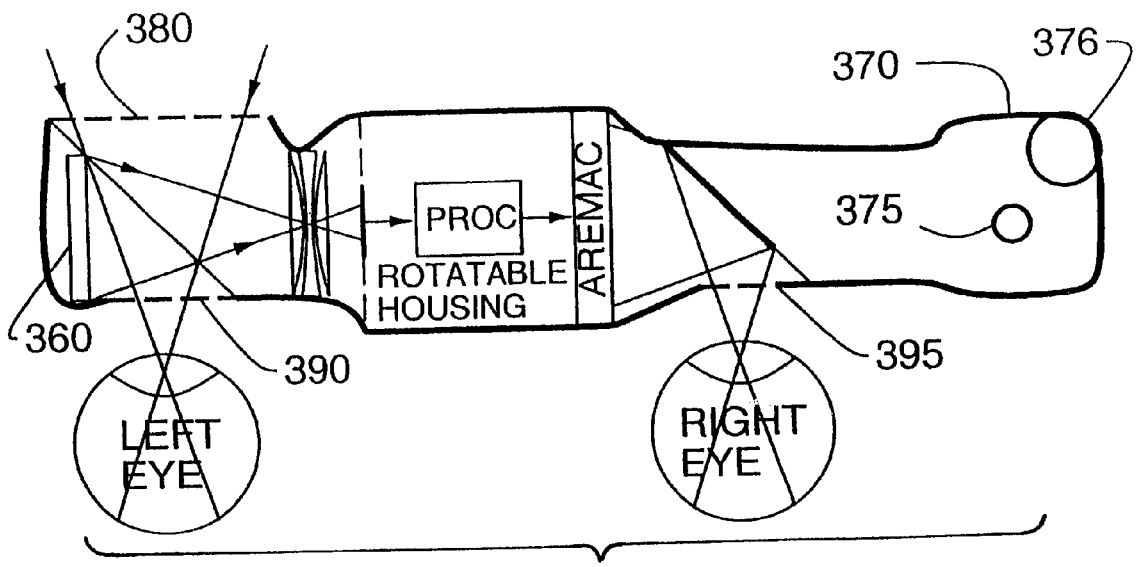
FIG. 3b – HAND-HELD CROSSEYE-TAP CAMERA

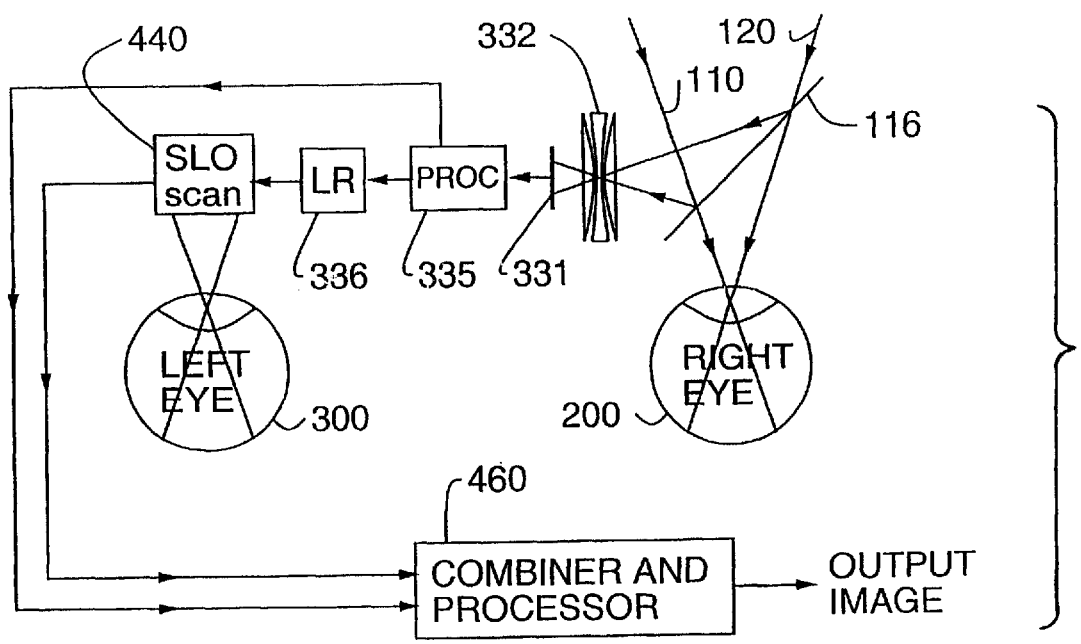
FIG. 4a – CROSSEYE-TAP CAMERA WITH SCANNER

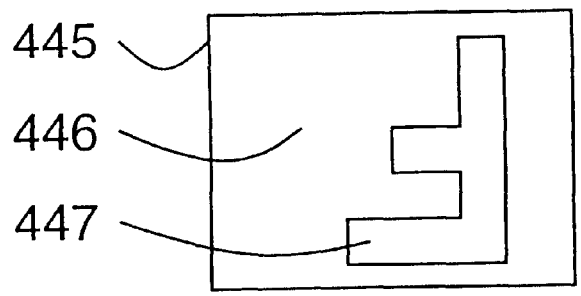
FIG. 4b – CROSSEYE-TAP SCAN AND DISPLAY, LEFT RETINA

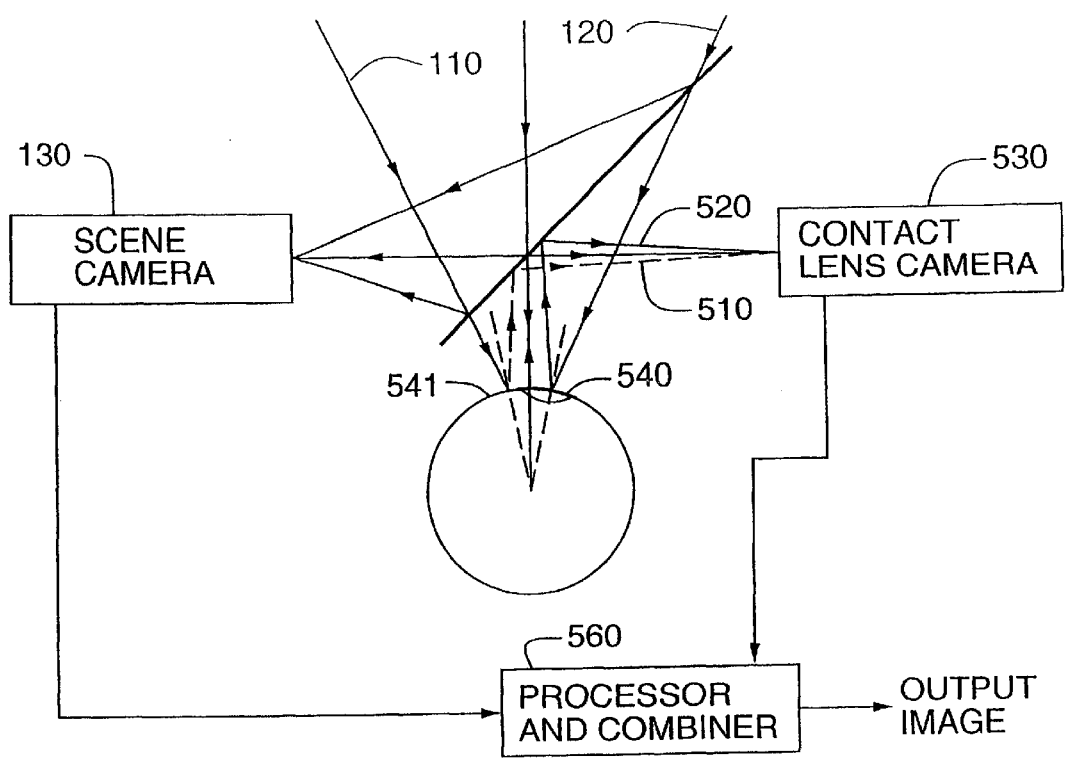
FIG. 5a – CAMERA BASED ON CONTACT LENS

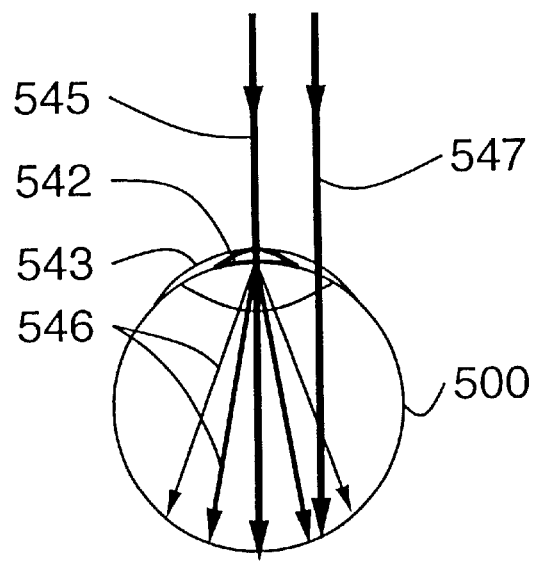
FIG. 5b –
DISPLAY BASED ON CONTACT LENS

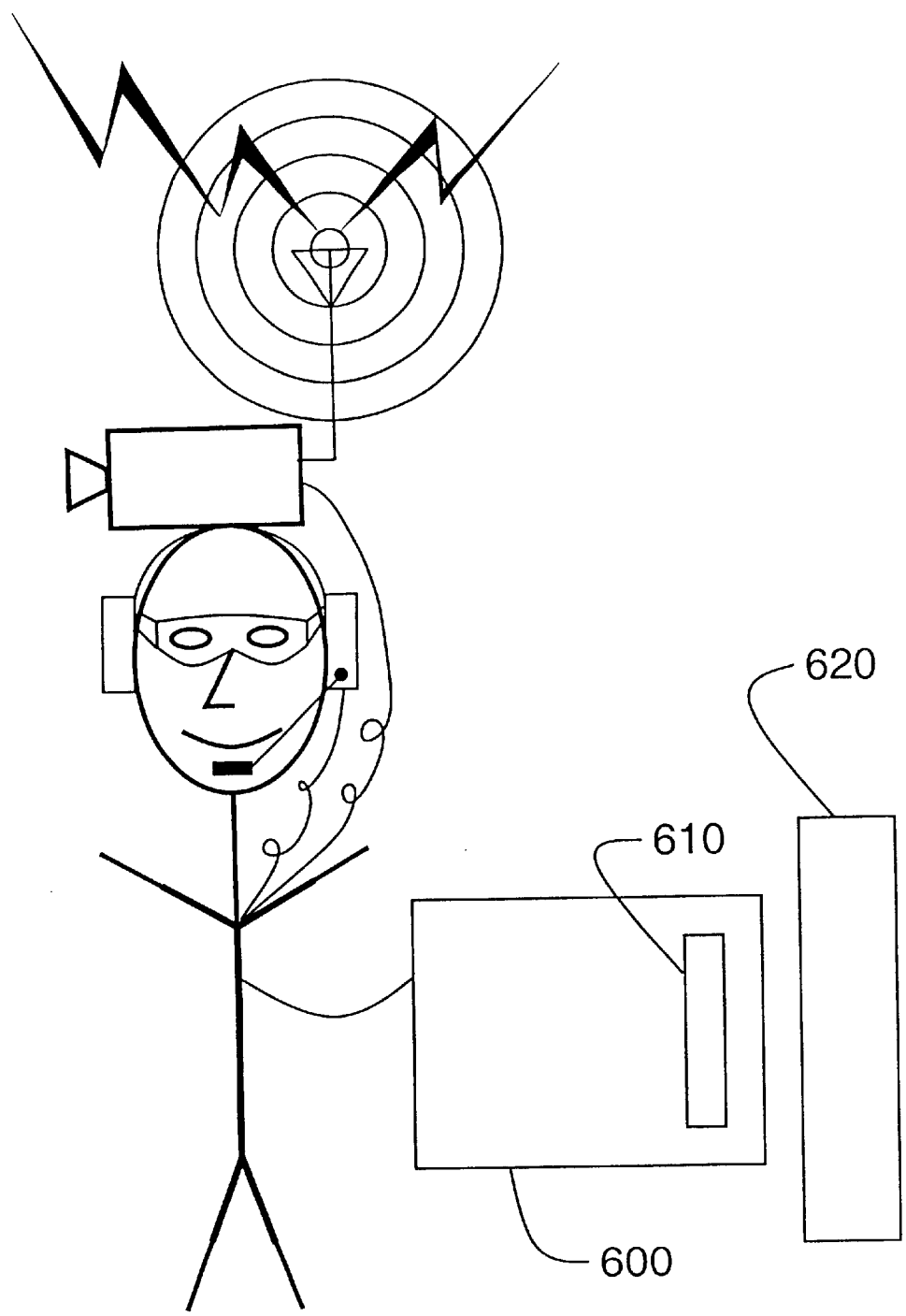
FIG. 6 – CAMERA AUTHENTICATION WITH IMPLANTABLE COMPUTER

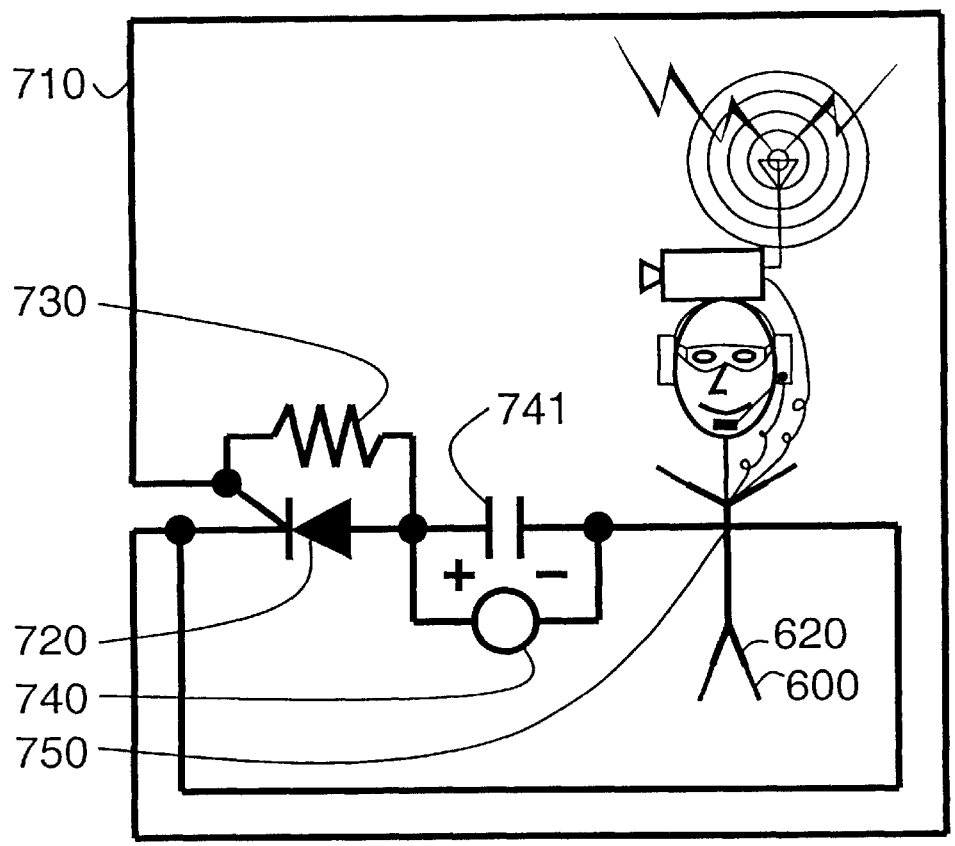
FIG. 7 – PERSONAL SAFETY DEVICE

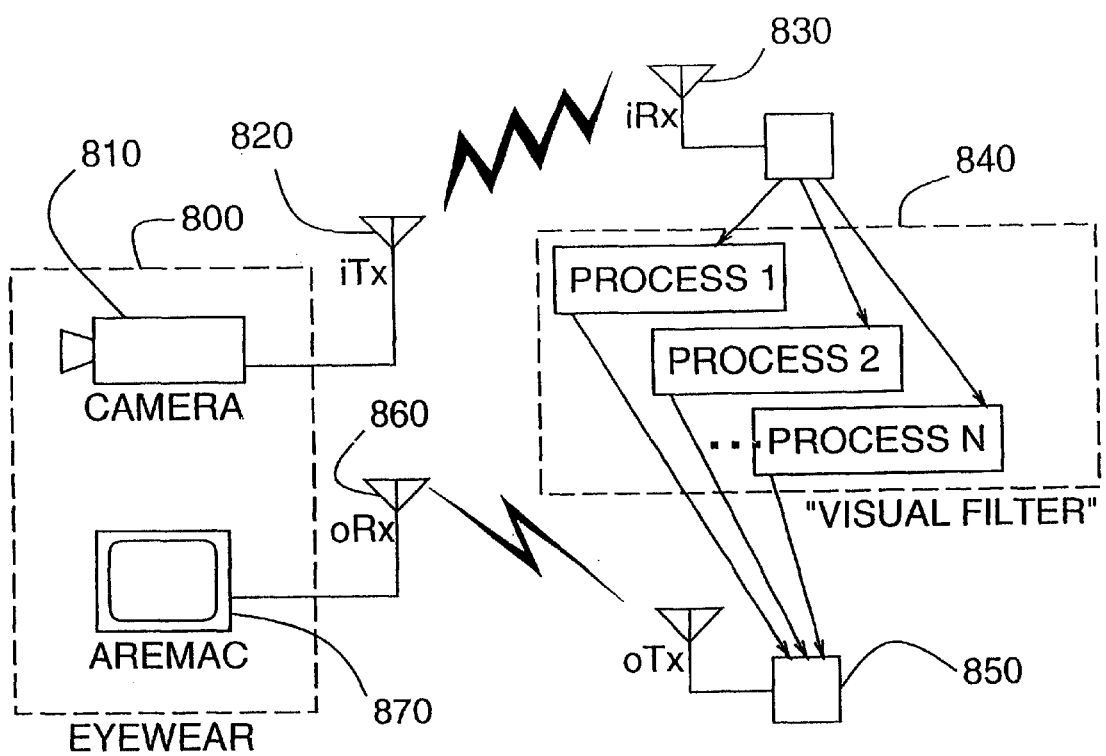
FIG. 8 – SYSTEM ARCHITECTURE

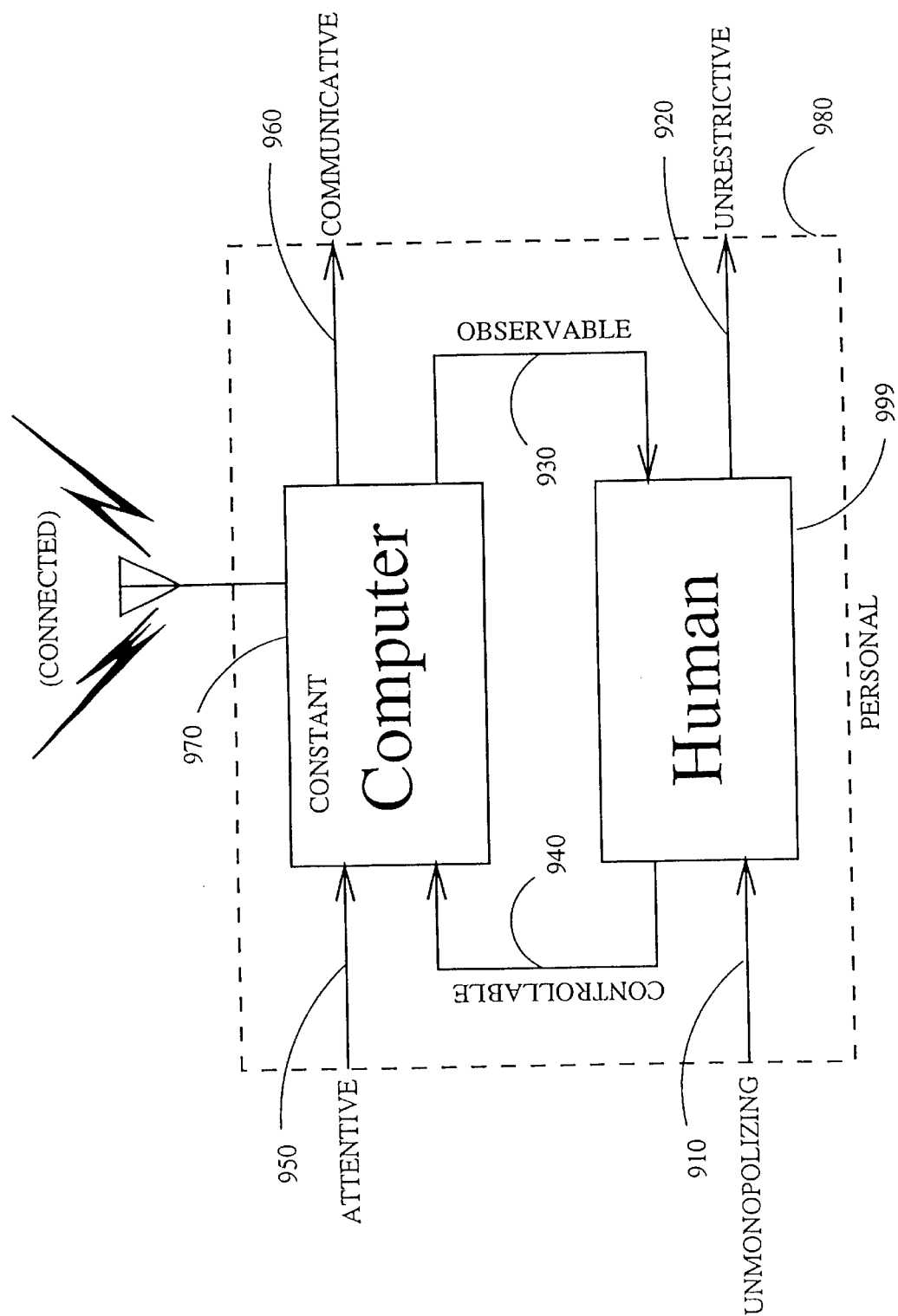
FIG. 9 - PERSONAL IMAGING COMPUTER

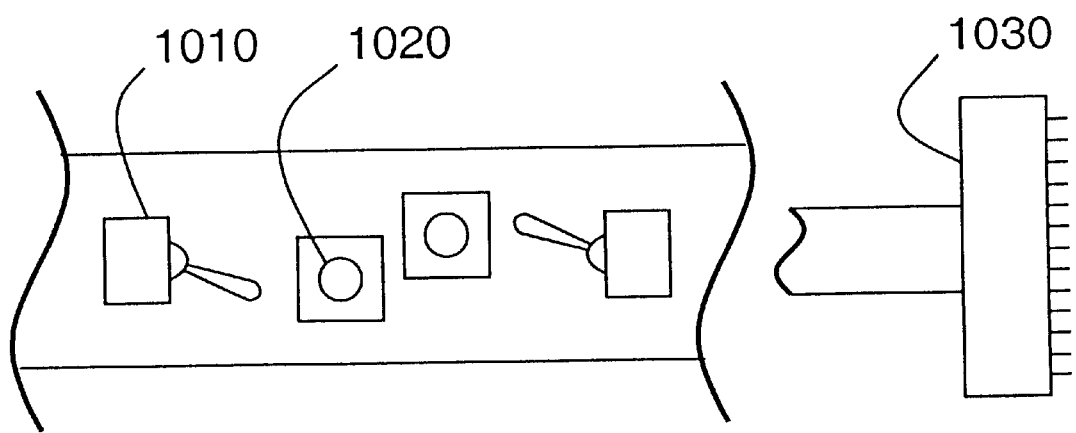
FIG. 10 – COVERT DATA ENTRY DEVICE FOR EYE-TAP CAMERA SYSTEM

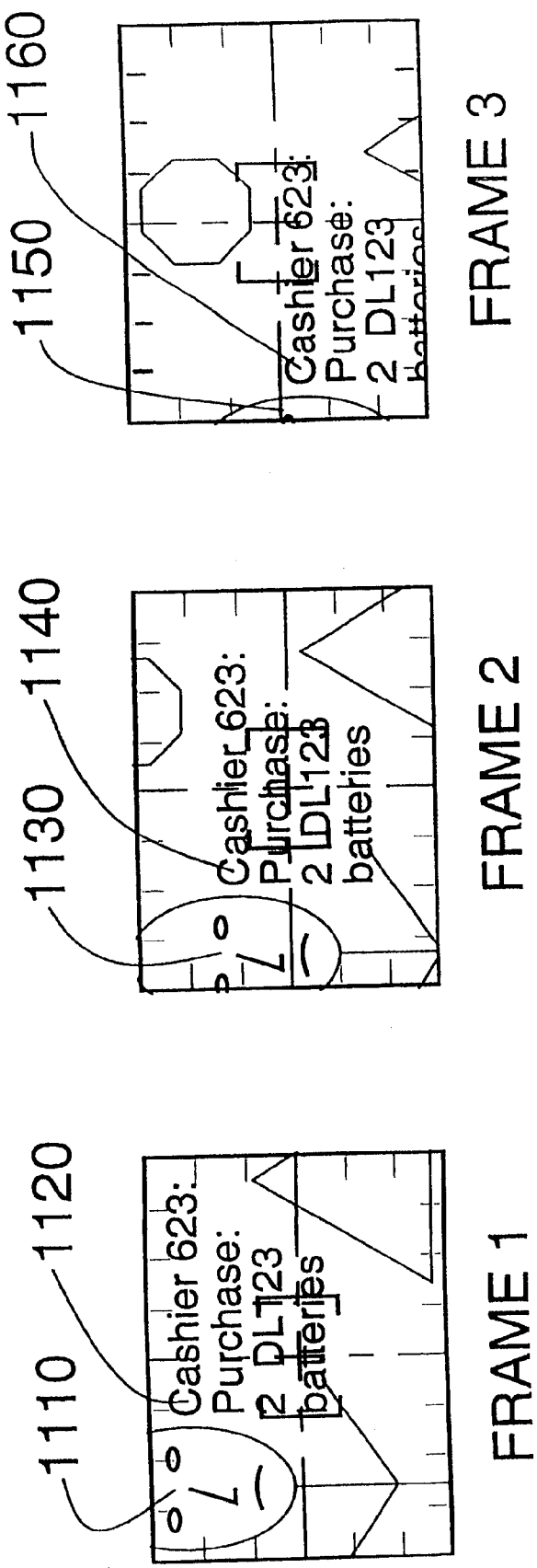
FIG. 11 – MEDIATED REALITY – JOURNALIST'S VIEW

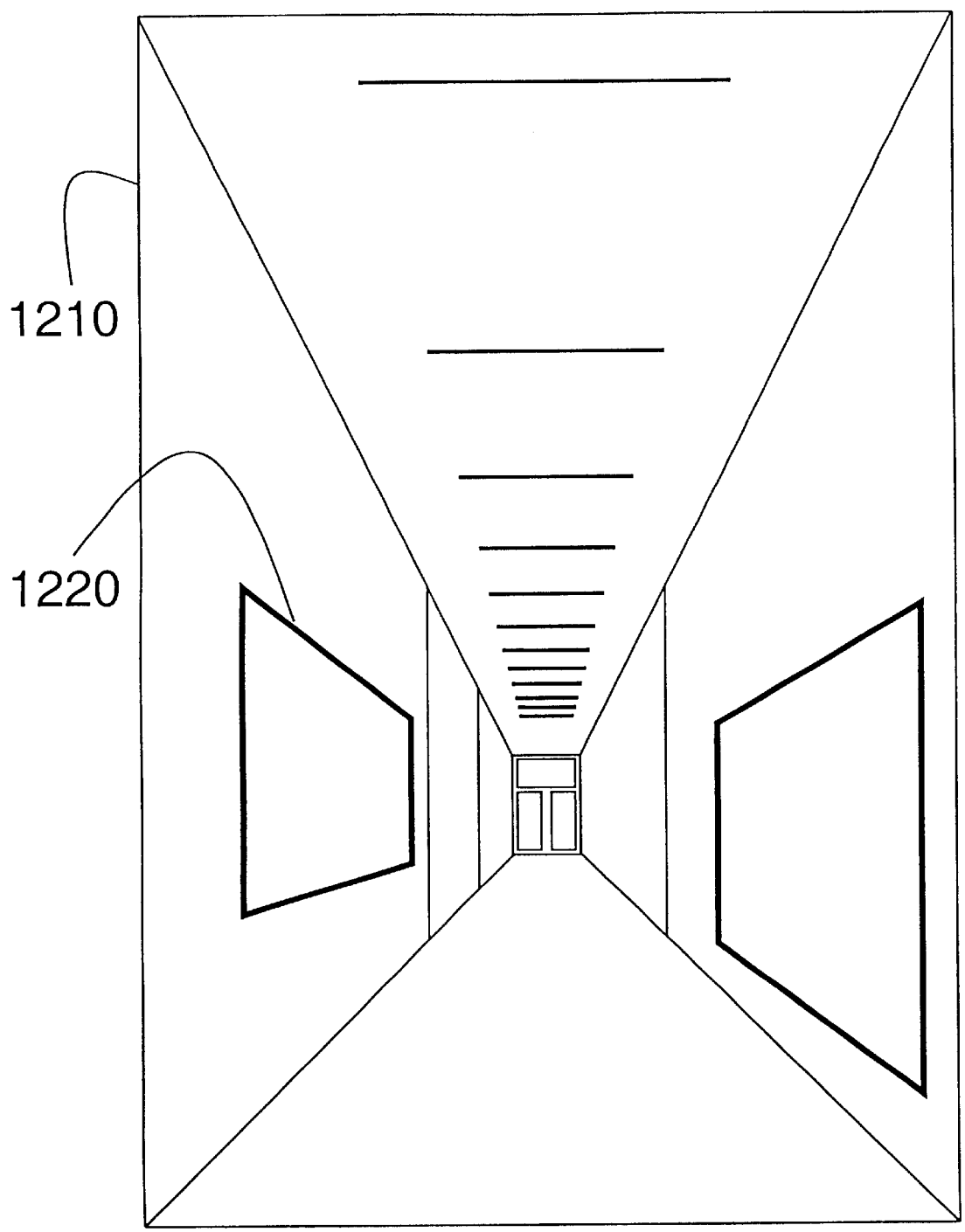
FIG. 12 – COMPUTER-SUPPORTED COLLABORATIVE NEWSGATHERING USING A VIRTUAL NEWSPAPER

EYE-TAP FOR ELECTRONIC NEWSGATHERING, DOCUMENTARY VIDEO, PHOTOJOURNALISM, AND PERSONAL SAFETY

CROSS-REFERENCE TO RELATED APPLICATION

This application is a continuation-in-part of U.S. application Ser. No. 09/172,599, filed Oct. 15, 1998, the contents of which are incorporated herin by reference.

FIELD OF THE INVENTION

The present invention pertains generally to a new photographic or video apparatus comprising a portable electronic camera device which captures rays of light collinear with rays passing through a point approximately at the center of the lens of an eye of the user. In this way, the device causes the eye itself to become, in effect, the camera. Preferably the apparatus also includes a viewfinder system, a computer, and a wireless communications link.

BACKGROUND OF THE INVENTION

In photojournalism, electronic news gathering (ENG), and in movie or video production, it is desirable to capture events in a natural manner with minimal disturbance to the subject matter being captured. Current state-of-the-art newsgathering apparatus creates a visual disturbance to others and attracts considerable attention on account of the camera crew, sound crew, the bulky equipment, and the manner in which it is deployed and used. Even when a single camera operator is assigned to a newsgathering task, the simple gesture of bringing or holding the camera up to the eye can disrupt the event being reported. Even if the size of the camera could be reduced to the point of being negligible (e.g. no bigger than the eyecup of a typical camera viewfinder, for example), the very gesture of bringing a device up to the eye is unnatural and attracts considerable attention, especially in establishments such as gambling casinos or department stores where photography is often prohibited, yet where newsworthy events frequently happen. Although there exist a variety of covert cameras which are frequently used in investigative journalism, such as a camera concealed beneath the jewel of a necktie clip, cameras concealed in baseball caps, and cameras concealed in eyeglasses, these cameras tend to produce inferior images, not just because of the technical limitations imposed by their small size, but, more importantly because they lack a means of viewing the image, as well as a means of having others view the image. In typical newsgathering scenarios, one person operates the camera while another carries a monitor to observe the technical quality of the video images. Often there is a news truck equipped with instrumentation so that technical staff can monitor the quality of the video signal, and report back to the camera crew by telephone or the like. Because of the lack of viewfinder means, and the lack of analysis/communications means between the camera operator and remote test equipment/technical staff, investigative video and photojournalism made with concealed cameras of the prior art suffers from poor composition and poor image/sound quality.

Recent experiments, as conducted by and reported by Mann, in a Massachusetts Institute of Technology (M.I.T.) technical report titled Mediated Reality (M.R.), Vision and Modeling Group TR260, (1994), which is available online at http://wearcam.org/mr.htm, show that moderate transformations such as rotation by a few degrees or moderate image displacements, often give rise to a reversed aftereffect that is more rapidly assimilated by the wearer than either very large or very small transformations. It is also shown that effects of moderate transformations can often have a more detrimental effect on performing other tasks through the camera as well as detrimental flashbacks upon removal of the camera, than that which would arise from either extreme or negligible transformations. This work also looked into the effects of using wireless communications with a remote image processing system as a means of mediated reality. These findings suggest that merely mounting a conventional camera such as a small 35 mm rangefinder camera or a small video camcorder to a helmet, so that one can look through the viewfinder and use it it hands-free while performing other tasks, will result in poor performance at doing those tasks while looking through the camera viewfinder, in addition to the obvious shortcoming of not having technical staff or other remote collaborators available.

Part of the reason for poor performance associated with simply attaching a conventional camera to a helmet is the induced noncollinearity (failure to provide a truly orthoscopic view). Even viewfinders which correct for parallax, as described in U.S. Pat. No. 5,692,227 in which a rangefinder is coupled to a parallax error compensating mechanism, only correct for parallax between the viewfinder and the camera lens that is taking the picture, but do not correct for noncollinearity between rays of light passing through the viewfinder and those that would be observed with the naked eye while not looking through the camera.

An object of the invention is to provide a viewfinder means that is suitable for long-term telepresence, computer supported collaborative photojournalism etc., suitable when wearing the camera for an entire day, looking through it all the while.

An important aspect of the invention is the capability of the apparatus to mediate (augment, diminish, or otherwise alter) the visual perception of reality. Traditional camera viewfinders often include the ability to overlay virtual objects, such as camera shutter speed, or the like, on top of reality, as described in U.S. Pat. No. 5,664,244 which describes a viewfinder with additional information display capability.

This electronic news gathering invention is related to known displays that are used in the field of Virtual Reality (VR) in the sense that both are wearable. However, an important difference is that embodiments of the invention allow the wearer to continue to see the real world, while VR displays block out the ability to see the real world.

Displays for helmet mounted aircraft weapons aiming applications have been developed, as described in U.S. Pat. Nos. 3,697,154, 3,833,300, 4,081,209, 4,220,400. Such displays do not directly incorporate a camera. Although they could be used to display the output image from an electronic camera (hand-held or perhaps mounted to the same helmet), the above-mentioned problems would still exist.

U.S. Pat. No. 4,806,011 describes an eyeglass-based display of a clock or the like.

Open-air viewfinders are often used on extremely low cost cameras, as well as on some professional cameras for use at night when the light levels would be too low to tolerate any optical loss in the viewfinder. Examples of open-air viewfinders used on professional cameras, in addition to regular viewfinders, include those used on the Grafflex press cameras of the 1940s (which had three different kinds of viewfinding means), as well as those used on some twin-lens reflex cameras. While such viewfinders could be used in the context of the invention, and would have the advantage of not inducing the problems such as flashback effects described above, they also fail to provide an electronically mediated reality.

Wearable display devices have been described, such as in U.S. Pat. Nos. 5,546,099, 5,708,449, 5,331,333, 4,636,866, but have no light sensing apparatus or wireless communications capability.

U.S. Pat. No. 5,640,221 also proposes an eye-tracking device which may be used in the context of the invention.

DESCRIPTION OF THE INVENTION

The apparatus of the invention can allow visual reality to be mediated in order to make certain that exposure is correct as well as to keep the wearer of the apparatus in the feedback loop of the photo compositional process by constantly providing the wearer with a video stream. Moreover, it is desired that the apparatus will allow the wearer to experience a computationally mediated visual reality, and for that experience to be shared through wireless communications networks so that the wearer may receive additional visual information, as well as be aware of modifications to visual reality that might arise, for example, as part of a communications process in a shared virtual environment. For such compositional and interactional capabilities, a simple air-based viewfinder is inadequate.

The invention facilitates a new form of visual art, in which the artist may capture, with relatively little effort, a visual experience as viewed from his or her own perspective. With some practice, it is possible to develop a very steady body posture and mode of movement that best produces video of the genre pertaining to this invention. Because the apparatus is lightweight and close to the head, there is not the protrusion associated with carrying a hand-held camera. Also because components of the apparatus of the invention are mounted very close to the head, in a manner that balances the weight distribution as well as minimizes the moment of inertia about the rotational axis of the neck, the head can be turned quickly while wearing the apparatus. This allows one to record the experiences of ordinary day-to-day activities from a first-person perspective, and, because of a communications infrastructure, to convey these experiences to a remote entity. Moreover, because both hands are free, much better balance and posture is possible while using the apparatus. Anyone skilled in the arts of body movement control as is learned in the martial arts such as karate, as well as in dance, most notably ballet, will have little difficulty capturing exceptionally high quality video using the apparatus of the invention.

With the prior art, the best camera operators tend to be very large people who have trained for many years in the art of smooth control of the cumbersome video or motion picture film cameras used. In addition to requiring a very large person to optimally operate such cameras, various stabilization devices are often used, which make the apparatus even more cumbersome. The apparatus of the invention may be optimally operated by people of any size. Even young children can become quite proficient in the use of some embodiments of the invention, and could make excellent photojournalists, especially if given the capabilities of a network of adult experts.

A typical embodiment of the invention comprises one or two spatial light modulators or other display means built into a pair of eyeglasses together with one or more light sensor arrays, a body-worn computer and image processing system, and a high-speed wireless communications link. Typically one or more CCD (charge coupled device) image sensor arrays and appropriate optical elements comprise the camera portion of the invention. Typically a beamsplitter or a mirror silvered on both sides is used to combine the image of the viewfinder with the apparent position of the camera. The viewfinder is not just a means of determining the extent of coverage of the camera in a natural manner, but it is also a communications means, so that, for example, a remote expert may provide advice in the form of text superimposed inside the viewfinder. In this manner the viewfinder functions as a teleprompter, as well as a means for judging photographic or video composition. Moreover, one or more remote experts may superimpose graphical elements in the viewfinder, such as a cursor or arrow that points to an object as depicted in the viewfinder. In this way the wearer may collaborate with one or more remote experts on matters such as scene content, or, for example, specific details of a photographic composition. Finally, the collaboration may take the form of one or more computer graphics renderings inserted into the viewfinder, together with the images of real objects. This allows the user to experience a computer-mediated reality in which there is a much more rich form of collaborative potential.

In some embodiments of the invention the viewfinder has a focusing mechanism that is coupled to a focusing mechanism of a camera system. In such embodiments, when the camera is focused on a particular object, the viewfinder also presents that object in a manner such that when the apparatus moves relative to the user's eye, the object appears to neither move with or against the movement of the eye, e.g. rays of light entering the eye are approximately collinear to corresponding rays of light that would be present if the apparatus were not present. This focusing of the camera may be manual or automatic, but in both cases, it is preferable that the viewfinder be either automatic in tracking the camera (whether manual or auto focus), or that it have sufficient depth of focus to allow a lens of an eye of the wearer itself to function as the focal selector, or that it be responsive to the focal state of a lens of an eye of the wearer. A viewfinder meeting one of these criteria will be referred to as an autofocus viewfinder.

A viewfinder-like function may come from various forms of devices that generate a visible image or a visual perception thereof. In some embodiments, a viewfinder which is a small television tube or LCD screen with appropriate optics so that the eye can focus on it as if it were far away, is used. In other embodiments the viewfinder-like function takes the form of an image created directly upon the retina of an eye of the wearer of the apparatus. A viewfinder device, or other kind of device that makes the eye perceive a picture, or creates a picture visible to the eye, or inside the eye, does the opposite of what the camera does, in the sense that it turns electrical signals into pictures or a visible perception like seeing a picture, while the camera turns pictures (light falling on an image sensor) into electrical signals. Because the viewfinder device, or equivalent device that turns electrical signals into pictures or visible perceptions equivalent to seeing or experiencing pictures, does the opposite of what a camera does, I will call the device an aremac. This word "aremac" is simply the word "camera" spelled backwards.

Preferably the viewfinder is a laser-based aremac, or other kind of aremac that has either infinite depth of focus or a sufficient depth of focus that there is a perceived unity between virtual and real objects for real objects at any depth plane. Alternatively, the aremac may be an automatic focus viewfinder, or other device where the limited depth of focus is mitigated by an automatic focusing system.

Preferably a collinearity criterion is satisfied, e.g. a wearable camera system with aremac is arranged so that the aremac displays video from the camera in such a way that all rays of light from the aremac that enter the eye appear to emanate from essentially the same direction as they would have had the apparatus not been worn.

Preferably the wearer experiences additional information overlaid on top of his or her visual field of view such that the information is relevant to the imagery being viewed, and also such that the virtual objects appear in the same depth plane as the real objects.

The apparatus of the invention gives a photojournalist a means of determining the composition of a picture from a display device that is located such that only the photojournalist can see the display device, and so that the photojournalist can ascertain the composition of a picture and take a picture or video and transmit these to one or more remote locations without the knowledge of others in the immediate environment.

The camera viewfinder can also function as a way of providing a photojournalist with the ability to collaborate with one or more remote entities, in matters pertaining to composition of a picture or video or in matters pertaining to an interview with one or more subjects.

In some embodiments, the viewfinder has a focusing mechanism coupled with the focus of a camera, such that both can be operated remotely with a single control, by a technician or camera operator at a remote location.

Some embodiments of the invention also provide a means by which a technician or camera operator at a remote location can signal to the wearer of the viewfinder which direction in which to turn, for best picture. These signals are typically vibrotactile or facilitated by direct electrical stimulation of the actual muscles needed to effect the actual change (e.g. a message to turn to the right is felt as a tug of the neck muscles that actually turn the head to the right).

In some embodiments a technician or camera operator at a remote location can signal to the wearer of a wearable camera which has no local viewfinder, which direction in which to turn, for best picture, while the remote technician or camera operator remotely monitors the video signal from the wearable camera.

Multiple photojournalists using the invention, at the same location, can also collaborate in such a way that multiple camera viewpoints may be shared among the photojournalists so that they can advise each other on matters such as composition, or so that one or more experts at remote locations can advise one or more of the photojournalists on matters such as composition or camera angle.

Certain embodiments of the invention provide a new genre of journalism in which content may be produced and consumed using the same wearable camera and display system. This content sharing capacity allows for such collaboration among photojournalists and others.

Typically embodiments of the invention allow a photojournalist to wear the apparatus continuously and therefore always end up with the ability to produce a picture from something that was seen a couple of minutes ago, through a retroactive record function into a circular buffer. For example, a "begin recording from 5 minutes ago" button works well if the apparatus is always worn and always ready.

Moreover, as an artistic tool for first-person perspective photojournalism, the apparatus allows the photojournalist to record, from a first-person-perspective, experiences that have been difficult to so record in the past. For example, a photojournalist might be able to record the experience of looking through binoculars while riding horseback, or the experience of waterskiing, rope climbing, or the like. Such experiences captured from a first-person perspective provide a new genre of video by way of a wearable camera system with viewfinder means that goes beyond current state-of-the-art point of view sports videos (such as created by cameras mounted in sports helmets which have no viewfinder means).

BRIEF DESCRIPTION OF THE DRAWINGS

The invention will now be described in more detail, by way of examples which in no way are meant to limit the scope of the invention, but, rather, these examples will serve to illustrate the invention with reference to the accompanying drawings, in which:

FIG. 1a is a diagram of a simple embodiment of the camera and aremac portion of the apparatus of the electronic newsgathering invention in which a portion of the field of view of the journalist wearing the apparatus is diverted into a camera by a diverter (two-sided mirror), and replaced with the view from an aremac viewfinder.

FIG. 1b is an embodiment of the camera and aremac in which the diverter is a beamsplitter, rather than a two-sided mirror, and in which the role of the aremac, which is shown by way of its internal components which serve as an example of how an aremac operates, is to provide additional information such as spatially varying exposure level indication, and the like.

FIG. 1c depicts how the camera and aremac might be mounted in a typical device, such as an electronic newsgathering telephone, which is shown in its closed position.

FIG. 1d shows the electronic newsgathering telephone open 180 degrees for illustrative purposes only, since the phone is preferably manufactured in such a way that it its fully open at 135 degrees when in normal usage.

FIG. 1e shows a detailed view of the electronic newsgathering telephone in both front view and top view.

FIG. 2a shows an embodiment of the invention which is responsive to an aspect of an eye of a user of the apparatus of the invention.

FIG. 2b shows an embodiment of the invention in which a good clear eye-tap image is obtained from rays of light diverted from those passing through the center of projection of a lens of an eye of the user of the apparatus, and at the same time, a less clearly defined but more expressive (and of greater forensic value) image is read out of the eye itself.

FIG. 2c shows a housing for the embodiment of the invention depicted in FIG. 2b.

FIG. 3a shows an embodiment of the invention which is a wearable crosseye-tap camera in which a portion of the rays of light entering one eye is diverted with a beamsplitter into a camera, the output of which is displayed into the other eye with an aremac.

FIG. 3b shows an embodiment of the invention which is a hand-held crosseye-tap camera in which a portion of the rays of light entering one eye is diverted with a beamsplitter into a camera, the output of which is displayed into the other eye with an aremac.

FIG. 4a shows an embodiment of the invention in which a portion of the rays of light entering one eye is diverted with a beamsplitter into a camera, the output of which is displayed into the other eye with a device that is both an aremac and itself another camera that scans out the eye being displayed to.

FIG. 4b shows the display on the retina, of the embodiment depicted in FIG. 4a, illustrating how the displayed data is factored out of the retinal scan of the eye, resulting in a retinal scan that does not depend appreciably on the data displayed thereupon.

FIG. 5a shows an embodiment of the invention based on a contact lens.

FIG. 5b shows an embodiment of the viewfinder of the invention based on a contact lens.

FIG. 6 depicts an authenticational aspect of the invention in which the source of pictures is authenticated by way of an implantable computer in communication with a wearable computer.

FIG. 7 depicts a Personal Safety Device (PSD) aspect of the invention which prevents theft of the apparatus, and discourages torture or other human rights violations against the wearer, in the same way that the ink-loaded anti-theft tags protect clothing from being stolen by shoplifters.

FIG. 8 depicts the overall system architecture of the apparatus of the invention, in which the camera transmits to a remote location, the image is processed, and the processed image is received by the apparatus and presented to the wearer upon a viewfinder.

FIG. 9 depicts the user-interface based on Humanistic Intelligence (HI).

FIG. 10 depicts a covert data-entry device, such as may be used to set white balance or shutter speed of the apparatus of the invention, in which a plurality of pushbutton switches are mounted to a belt.

FIG. 11 depicts a journalist's view through the viewfinder of the apparatus of the invention, depicting three frames of the video sequence observed in the journalist's viewfinder, in which the journalist's perception of reality is altered by way of a simple object-tracking textual overlay on top of what would normally be seen through the viewfinder.

FIG. 12 shows an application in which the apparatus is used as a means of consuming, not just producing news, and in particular this diagram depicts a virtual newspaper as seen through the special eyeglasses, especially useful for building a community of networked photoborgs living in a shared computer-mediated world.

While the invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

In all aspects of the present invention, references to "camera" mean any device or collection of devices capable of simultaneously determining a quantity of light arriving from a plurality of directions and or at a plurality of locations, or determining some other attribute of light arriving from a plurality of directions and or at a plurality of locations. Similarly references to "television" shall not be limited to just television monitors or traditional televisions used for the display of video from a camera near or distant, but shall also include computer data display means, computer data monitors, other video display devices, still picture display devices, ASCII text display devices, terminals, and the like.

Similarly, references to "photojournalist" shall mean all manner of journalist, photographer, videographer, filmmaker, or the like.

DETAILED DESCRIPTION OF THE INVENTION WITH REFERENCE TO DRAWINGS

FIG. 1a shows an embodiment of the electronic newsgathering system whereby rays of light spanning a visual angle from ray 110 to ray 120 enter the apparatus and are intercepted by a two-sided mirror 115, typically mounted at an angle of $\pi/4$ (45 degrees) with respect to the optical axis of a scene camera 130. These rays of light which would otherwise enter an eye of a wearer of the apparatus, instead enter camera 130. The video output of the camera 130 is displayed upon aremac 140 possibly after having been processed on a body-worn computer system or the like. A reflection of aremac 140 is seen in the other side of mirror 115, so that a synthetic image of ray 110 appears as virtual ray 160 and the synthetic image of ray 120 appears as virtual ray 170. Rays of light from the aremac typically form virtual light. Virtual light is light in which rays of light converge, rather than diverge. Since the camera 130 records an image that is backwards, when it is connected to aremac 140, aremac 140 displays a backwards image. Since the aremac 140 is observed in a mirror, the image is reversed again so that the view seen at eye location 190 is not backwards. In this way a portion of the wearer's visual field of view is replaced by virtual light depicting the exact same subject matter as would be seen in the absence of the apparatus. The virtual light is in perfect spatial register with the real light that would have been seen from the real world, in the absence of the apparatus. A system in which some rays of light (such as 110) are diverted before reaching eye 190 and replaced with rays of virtual light (such as 160) which are each collinear with the corresponding ray of real light (e.g. 110) from which they were derived is said to satisfy the collinearity criterion.

Systems that satisfy the collinearity criterion produce an illusory transparency. In other words, diverter 115 is completely opaque (no light can pass through it), yet the user can see "through" it in the sense that when the user looks into the diverter, there is provided a view of what is beyond the diverter. Of course this illusory transparency is lost once the system is shut off, e.g. when the system is shut off, the diverter functions as a partial blindfold or eye patch that blocks a portion of the user's field of view.

In typical usage of the apparatus, camera 130 is responsive to rays of light that are collinear with lines passing through the center of a lens of an eye of the wearer of the apparatus, so that the eye itself functions, in effect, as the camera (e.g. that the camera viewpoint is as if the eye were the camera).

The apparatus behaves as if the eyeball were removed and replaced with a camera at the exact location of the eyeball. Since the device can so perfectly tap into the eye, providing an almost exact replica of the signal going into the eye (just as tapping a telephone provides a listening experience almost exactly like those involved in the conversation hear), the apparatus will be referred to as an eye-tap camera.

In practice, aremac 140 often comprises a viewfinder with a focus adjustment, and the focus adjustment is often driven by a servo mechanism controlled by an autofocus camera. Thus camera 130 automatically focuses on the subject matter of interest, and controls the focus of viewfinder 140 so that the apparent distance to the object is the same while looking through the apparatus as it would have been if the user were not wearing the apparatus.

In some embodiments the focus is manual. It is desirable that embodiments of the electronic newsgathering invention comprising manual focus cameras have the focus of the camera linked to the focus of the viewfinder so that both may be adjusted together with a single knob. Moreover, a camera with zoom lens may be used together with a viewfinder having a zoom lens. The zoom mechanisms are linked in such a way that the viewfinder image magnification is reduced as the camera magnification is increased. Through this appropriate linkage, any increase in magnification by the camera is negated exactly by decreasing the apparent size of the viewfinder image.

The focus may, alternatively, be controlled by a remote expert or technician, so that the journalist can concentrate on higher-level issues such as videographic composition or doing an interview.

The calibration of the autofocus zoom camera and the zoom viewfinder may be done by temporarily removing the mirror 115 and adjusting the focus and zoom of the viewfinder to maximize video feedback. This must be done for each zoom setting, so that the zoom of the viewfinder will properly track the zoom of the camera. By using video feedback as a calibration tool, a computer system may monitor the video output of the camera while adjusting the aremac and generating a lookup table for the viewfinder settings corresponding to each camera setting. In this way, calibration of the camera and aremac may be automated during manufacture of the apparatus of the invention. Some similar embodiments of the invention use two cameras and two viewfinders. In some embodiments, the vergence of the viewfinders is linked to the focus mechanism of the viewfinders and the focus setting of cameras, so that there is a single automatic or manual focus adjustment for viewfinder vergence, camera vergence, viewfinder focus, and camera focus.

FIG. 1b shows an embodiment of the electronic newsgathering system based on a camera system that uses a beamsplitter rather than a two-sided mirror for a diverter. In this case, only a portion of a ray of light 110 passing through beamsplitter 116 is diverted from eye 160 into camera 130. The rest of the ray 110 goes through the diverter along with ray 160 of virtual light. In this way the eye experiences a mixture of real and virtual light.

Unlike the apparatus depicted in FIG. 1a in which the system must be operating in order that it not obstruct a portion of the user's vision, the apparatus of FIG. 1b does not function as an eye patch or partial blindfold when it is not running an illusory transparency. In other words, since diverter 116 is a beamsplitter, it is not necessary that virtual light be synthesized in order for the wearer have a complete and unobstructed vision. Therefore diverter 116 can be of greater extent than diverter 115 was. In particular diverter 116 can cover a larger portion of the visual field of view than that seen in the aremac. In FIG. 1a, diverter 115 was carefully made so that that portion which it blocked was replaced by virtual light. Diverter 116, however, need not be so constructed, and may, in fact, cover a larger field of the user's vision than the portion of it which reflects light from the aremac into an eye of the user. In this manner, the perceived edge of the image area of the viewfinder or viewfinder effect is not abruptly ended by the diverter, but, rather, is defined only by the light reflected off the diverter 116. Moreover, since the device is transparent, any material presented by the display capability of the system may be used to aim the camera and determine how much extent the camera has. Thus one can aim the camera while reading an email message, or surfing the world wide web, since so doing causes there to be a display screen which will ordinarily have a rectangular raster associated with it. The shape of the rectangular raster thus determines the coverage of the camera even when the raster is not responsive to an output from the camera.

In this beamsplitter embodiment of the invention, the aremac is preferably comprised of a spatial light modulator 141 together with optics 142 and a point source 143 of light, such that there is no need for any focus adjustment. In this embodiment with the point source of light, the aremac is to a pinhole camera as an ordinary camera viewfinder is to an ordinary camera. Such an aremac has infinite depth of focus, so that the user can see everything clearly in focus from the blood vessels inside an eye of the user, to infinity. Thus, if a complete and full light colored image (such as when aiming the apparatus at an evenly illuminated white wall) is displayed upon spatial light modulator 141, the wearer will typically see aspects of his or her own iris superimposed upon the image, along with specks of dust upon the eye lens surface, as well as the wipe marks of the eyelids (in the same way as one sees wipe marks on the windshield of a car, when the wipers sweep back and forth on a rainy day).

Such a view is often desirable for its expressive quality, and the manner in which it lets the user see into his or her own eye, and the way in which it creates a cybernetic feeling of being at one with the machine. However, in the event that such infinite depth of focus is not desirable (e.g. insofar as it might be confusing to novice users), processor 135 is often used to modify the image from camera 130 and extract just the salient details that are needed, so that a full and complete image is not presented to the user. For example, the image to spatial light modulator 141 may be simply a spatially varying graphic, such as zebra stripes, or plus ("+") signs appearing only in areas of the image that are overexposed. With such minimal content, the appearance of the blood vessels in the eye, etc., is not discernible. Other embodiments display zones of exposure throughout the image as ascii art, where processor 135 is typically a wearable computer running the linux operating system or a computer built into the apparatus of the invention, and spatial light modulator 141 might, for example, be the output of the computer formed from function calls using the aalib ascii art library.

Alternatives to ascii art also include simply adding noise to the image, or passing the image through a high pass filter to make it look more like a line drawing. More advanced processing may also be done to optimize the psychophysical tendency to find television more compelling than real life.

People tend to look at a television screen regardless of what is playing on the screen. Even if the television is tuned to a blank station, and just playing "snow" (random noise), people will often linger with gaze fixated upon the screen. Accordingly, by presenting material in a dynamic varying form, whether through ascii art video, high-pass filtering, line-art, or other related means, there can easily be created a system whereby the user, without conscious thought or effort, has a compulsive urge to place the subject matter of greatest interest within the mediation zone (the zone over which the visual perception of reality is altered, which also corresponds to the field of view of the camera).

Point source 143 is typically a red laser diode, or a combined point source from two laser diodes (red and green) where the laser diodes are combined with a beamsplitter prior to being passed through a pinhole spatial filter and beam spreader. Additionally, a raw (unencapsulated) blue LED may be used in addition to the two laser diodes, to create three colors. When multiple (red and green, or red and green and blue) sources are used, they may be sequenced in sync with the material displayed on spatial light modulator 143, so that a color image results.

Point source 143, when polarized, is preferably oriented at a favorable angle of polarization with spatial light modulator 141. Spatial light modulator 141 is preferably mounted so the preferred polarization orientation will be such that the major axis of the point source is aligned along the major axis of spatial light modulator 141.

Polarizer 131 in front of camera 130 prevents video feedback.

FIG. 1c shows an embodiment of the electronic newsgathering system mounted in a folding telephone having a main body 180 which includes antenna 185. Foldable out from main body 180 is mouthpiece 182. Mouthpiece 182 normally occupies the whole width of known telephone, but in the invention, mouthpiece 182 is very narrow, to allow room for an eyepiece. Unlike known cellular telephones, the invention includes an eyepiece 184. The mouthpiece unfolds in the way known folding cellular telephones unfold, at fold point 195. Eyepiece 184, however has an additional pivot point 196, in addition to fold point 195.

FIG. 1d shows the newsgathering telephone opened out 180 degrees for illustrative purposes. In actual use, the phone stops opening at 135 degrees, where it is considered to be fully open. The main body 180 includes an earphone 181 as known telephones do. Mouthpiece 182 is shown opened, so that microphone 183 is visible.

Eyepiece 184 swings upward through an angle of approximately 70 degrees at pivot point 196, when it is opened 135 degrees at pivot point 195. Preferably both the earpiece and eyepiece fold out together, and the eyepiece automatically swings around pivot point 196 through the approximately 70 degree angle. Both the mouthpiece 182 and the eyepiece 184 may be spring-loaded so that the phone flips out into its normal operating position in a fraction of a second.

Eyepiece 184 holds aremac 140 and camera 130, and houses diverter 116, in an arrangement similar to that illustrated in FIG. 1b. Preferably diverter 116 is a beamsplitter, rather than a two-sided mirror like that shown in FIG. 1a. In order to prevent diverter 116 and other apparatus from being pushed into the user's eye, should the user, for example, be hit in the face by a ball, or the like (e.g. while covering sporting events), eyepiece 184 is much larger than it needs to be. In this way, the possibility of eye damage is greatly reduced. Eyepiece 184 is preferably made of transparent material so that the user can see through most of it, except for certain components such as portions of camera 130 and aremac 140 that might block some vision in the right eye. However, this blocking is minimal, and the user can see through both eyes in a relatively unobstructed manner while using the apparatus of the invention.

The optical axis of camera 130 (and that of diverter 140) is typically oriented approximately 30 degrees clockwise with respect to the axis across eyepiece 184, so that when eyepiece 184 flips out and up approximately 70 degrees, the optical axis of camera 130 (and that of diverter 140) will be approximately 10 degrees clockwise of horizontal. Since eyepiece 184 is tipped slightly during use, the optical axis will thus be approximately horizontal during use.

FIG. 1e shows a closeup detail, front view and top view, of the newsgathering telephone. When eye 199 is correctly placed, the center of projection of camera 130, which is an equal distance from optical axes intersection point 191, along the optical axis of camera 130, as eyetap point 190 is from optical axes intersection point 191, along the optical axis of eye 199, which lines up with the approximate center of projection of the lens of eye 199.

Correct alignment of the apparatus with respect to the user results in increased performance, so aremac 140 may be fitted with nose bridge support 145, to help in registering the apparatus against the user's face, in the proper manner. Nose bridge support 145 may be adjustable by the user, or custom-made/adjusted for a specific user.

FIG. 2a depicts an embodiment of the invention in which a portion of the field of view that would otherwise pass through the center of projection of a lens of an eye of the wearer of the apparatus is diverted by way of beamsplitter 116 into a real camera 130. Beamsplitter 116 diverts light between rays 110 and 120, while light beyond these (e.g. beyond ray 210 to the left, or beyond ray 220 to the right) is not affected by the apparatus and passes straight through to eye 200.

Ordinarily cameras are responsive to rays of light that meet at a center of projection of the camera, and these ordinary cameras will be referred to as real cameras. Similarly ordinary light sources produce diverging rays of light, and will be called real lights.

Real lights produce diverging rays of light and real cameras are responsive to converging rays of light.

A special kind of camera that is responsive to diverging rays of light may be constructed, and is called a virtual camera. A simple example of a virtual camera is an ordinary camera with the lens deliberately set out-of-focus, where the distance between the lens and the sensor array is less than it would normally be for proper focus. In particular, for a particular distance between lens and sensor array, instead of focusing a point to a point, it focuses a point to the entire sensor array, and thus the camera becomes responsive to rays passing through a single point, such that each element of the sensor array is responsive to rays of light having a certain angle of azimuth and elevation as they pass through this single point. Other kinds of virtual cameras may also be built using a sensor array, and alternative optical arrangements.

Virtual camera 250 receives diverging rays of light from eye 200, providing information about an eye of the wearer of the apparatus, and may, for example, provide information such as degree of flex of the lens of the eye of the wearer of the apparatus, or a view into the eye. A view into the eye results from rays of light passing through the lens of an eye 200 of the user.

Virtual camera 250 and real camera 230 are fed to processor and combiner 260 to produce output pictures or output video. This output video has forensic value if it can be shown that the video must have been taken from a particular eye of a particular individual. Eye information is also useful in controlling the real camera, and the image acquisition process. In some embodiments, virtual camera 250 is or includes a normal real camera with optics to provide convergence of light rays and magnification for a close up view of the eye to determine direction of gaze, etc.

The acquisition, storage, or transmission of images may also be governed by attributes of eye 200. For example, when the pupil of eye 200 is dilated more than it would normally be for a given light level, pictures can be taken more rapidly, or picture capture can be initiated when none would normally be initiated, or a circular buffer can be stopped, dumped to storage, or transmitted. Since camera 130 can be used as an array of lightmeters, an inference can be made about how much pupil dilation would be expected for a given light level and scene contrast. Also, the system may "learn" what is normal in terms of pupil dilation for various light levels. It is well known that physiological effects of fear can cause eye pupils to open up, such that a wearable camera system responsive to such opening may be useful as a personal safety device for reducing crime.

FIG. 2b depicts an embodiment of the invention in which the virtual camera is a retinal camera. Retinal scanners are well known in the art of security and access control.

Accordingly, a retinal camera can be used to provide, through processor and combiner 260, an image which is cogent and compelling evidence that the wearer of the apparatus of the invention was present at the scene of the picture or video captured. For example, a court could be convinced that a picture of a car accident must have been taken by the right eye of a person accused of committing a robbery in another part of the city. If it can be shown that the two events were simultaneous, such evidence may, for example, be used to show that the wearer of the camera must not have been present at the scene of the crime and therefore must not have committed the crime for which he was accused. Therefore, the apparatus can function as a personal safety device insofar as it may be used to occasionally capture pictures of known subject matter.

Moreover, the virtual camera comprising sensor array 251 and optics 252 also includes a directional filter 253, such that there can be sufficient gain applied to the system, so as to see into the eye 200, and therefore to see what the eye 200 sees, as a view from within eye 200. In particular, because the directional filter attenuates unwanted rays of light, a sensor array of greater sensitivity can be used, such that the overall system can be made more responsive to desired rays of light before the response will be contaminated by undesired rays of light. The image will thus include aspects of the eye that make the image unique to that eye. If eye 200 has transfer function G, then the image from the virtual camera will be affected approximately as $G^2$, having captured light passing through the eye twice (once in, once out). Thus the output from real camera 130 may be used to compensate for G, and calculate a true eyeview image by processing the output of both cameras with processor 260. A true eyeview image has certain desirable expressive and artistic characteristics that define a new genre of videography, which is of great value in certain kinds of documentary video shooting.

FIG. 2c depicts a housing for a typical embodiment of the invention. A first opening 280 in the housing admits light. Camera 130 is protected by a transparent window 231. A second opening 290 comprises a transparent window. This embodiment of the electronic newsgathering system is preferably sealed and waterproof, such that it may be used to capture experiences like waterskiing from a first-person perspective. Opening 290 may also include an eyecup that seals around the eye so that the apparatus can be used underwater.

The housing depicted in 2c is suitably shaped for a right eye 200. Real camera 130 would rest upon the nose bridge, or the right portion of the nose bridge. There may also be two identical units, one for each eye, so that recordings can be made in stereo. In this case the left eye side would be an approxiate mirror image of the right eye side, or both units may be built into a single housing in which cameras 130 for both right and left sides rest on the nose bridge.

FIG. 3a depicts an embodiment of the electronic newsgathering apparatus using a camera in which a portion of the rays of light from ray 110 to ray 120 that would otherwise enter right eye 200 is instead diverted by diverter 116 to a camera comprised of sensor array 331 and optics 332. In this way right eye 200 has an unobstructed view, but is also made to function, effectively, as the camera for the electronic newsgathering system. The output of sensor array 331 is passed through processor 335 to aremac 340 where it is directed by mirror 315 and/or beamsplitter 316 into the left eye 300 of a user of the apparatus. In this way, the apparatus causes the user to experience two right eyes.

The term "seeing crosseyed" is ordinarily used to mean a condition when one is suffering from strabismus, or one who is deliberately directing the eyes in an unnatural fashion such as one does when trying to see a stereo image pair. Since the apparatus of FIG. 3a causes one eye to become crossed over to see out through the other eye (e.g. is crossed over to be responsive to the other eye's eye-tap), such an apparatus will be called a crosseye-tap camera.

Typically a mirror 315 is used rather than a beamsplitter 316, so that at least a portion of the field of view of the left eye 300 is blocked from seeing anything other than a reconstructed version of rays 110 to 120. The reconstructed rays span the same field of view as the original rays 110 to 120. In this way, both the left eye 300 and right eye 200 effectively see out through the right eye 200. This allows the operator of the newsgathering system to use both eyes to see through the one eye (right eye) that is the eye that is, in effect, the camera. Ordinarily videographers shoot with a camcorder over the right eye, and use the left eye to supply context (e.g. to anticipate what will enter the frame), causing there to be a difference between the two views. However, with the apparatus of the invention, the views are united, and the operator becomes, in effect, a monocular cybernetic organism in which all processing capability of the human brain and its visual system is directed to the right eye. The left eye therefore experiences somewhat of a television image of what the right eye is seeing, and the right eye functions as the camera as well as functioning as the contextual eye to anticipate what will enter or leave the frame.

This embodiment of the apparatus of the invention, when manufactured in a wearable form (e.g. covertly concealed in eyeglasses) may be used for meta documentary, such as when shooting a documentary about shooting a documentary. In meta documentary, the wearer of the glasses carries an ordinary camcorder and records the experience of looking through the viewfinder of the camcorder. In this way the wearer, in effect, has two right eyes, one which is natural and is the camera that shoots through the viewfinder of the camcorder, and the other that is a viewfinder for the viewfinder of the camcorder. Thus the wearer can capture a true and accurate depiction of what it is like to walk around with a camcorder, so that those viewing the documentary are, in effect, taken inside the eyecup of the camcorder viewfinder so they can vicariously experience the making of a documentary. The camcorder need not actually record, but may in fact be nothing more than a prop.

Known cameras fit over one eye, so they can be rotated sideways when the user wishes to shoot in portrait mode rather than landscape mode. However, the apparatus of the invention depicted in FIG. 3a fits over both eyes, and cannot therefore be easily rotated as a whole unit, without having it uncover one or both eyes. Accordingly, the apparatus is preferably constructed so that aremac 340, or at least the active portion thereof, may be rotated together with sensor array 331, so that both can be simultaneously changed from landscape to portrait orientation or the like. Preferably both are mounted in a single housing 310 which rotates within the housing 311 which holds the rest of the apparatus depicted in FIG. 3a. Rotatable housing 310 allows any orientation between and including portrait and landscape to be selected. For example, it may be desired to shoot on the diagonal.

Thus the display is arranged so that when the electronic newsgathering apparatus of FIG. 3a is held up to a face of the user, the display is observable a second eye of the user, and the display is arranged so as not to be seen by a first eye when the apparatus is held up to both eyes of the user.

Housing 310 is mounted inside a second housing 311. The second second housing 311 may be wearable, and the first housing is rotatable around an axis of rotation parallel to a line going through both eyes of a wearer of the second housing.

FIG. 3b depicts an alternate embodiment of the crosseye-tap camera of the electronic newsgathering invention. This embodiment is handheld rather than wearable, and thus includes a handle 370. Handle 370 also includes controls, such as a control to 376 to select from among portrait or landscape modes of operation, and a capture button 375 to grab and transmit a picture to a remote site.

Since a handheld camera cannot be readily used for meta documentary (which requires a right eyeview since most camcorders are right eyed), the device may be either left-eyed or right-eyed. In the drawing, a left-eyeview system is depicted, where the roles of the eyes is reversed from that depicted in FIG. 3a, so that in this embodiment the effect is to have two left eyes while looking through the viewfinder. The left eye is, in effect, the camera, and the right eye sees out through the left eye by way of the aremac. Additionally, a reticle generator 360 is added, so that a small viewing rectangle may be superimposed over the left eye, in addition to the television image of the left eyeview that is presented to the right eye. Reticle generator 360 may be of a simplified design such that it can present the image of a reticle that moves in accordance with the vergence of the eyes or the focus of the camera, such that the rectangular outline or grid of the reticle in the left eye aligns with the video picture displayed to the right eye.

FIG. 4a depicts an embodiment of the eye-tap camera, which is similar to the crosseye-tap camera depicted in FIG. 3a (and like parts have been given like reference numerals), except that the aremac 340 has been replaced with a scanner 440. Since there is no mirror between left eye 300 and scanner 440, a left-right image reversal circuit 336 processes the video signal so the image will be flipped L-R.

FIG. 4b depicts the left retinal view of the scanner of this embodiment of the electronic news gathering invention, referencing FIG. 4b along with FIG. 4a. A raster is generated on the retina of left eye 300, where text, video, or graphics, or any combination of these, is presented to the user of the apparatus. In practice, processor 335 is typically a wearable computer running the Linux operating system with the XFreeS6 variant of X-windows, so that the material on left eye 300 is typically X-windows which display a combination of textual and graphic information together with video from the right eyeview camera. Alternatively, SVGAlib is often used. For simplicity, however, suppose that the material to be displayed is a single letter of the alphabet. The first letter of the alphabet for which one can determine its orientation is the letter "F", so consider the letter "F" displayed on the left retina in raster 445. Suppose the background 446 is black, while the foreground 447 is white. While scanning the information onto the retina, scanner 440 also scans information from the retina by compensating for the different illumination between 446 and 447. Most notably, the scanning process is active, and the amount of drive is simply varied to scan information onto the retina, while at the same time, measuring the result. Thus the image combiner and information processor 460 (which may be included as part of the same wearable computer system as processor 335) can produce an output image that is responsive to aspects of the left eye of the wearer of the apparatus, including identifying attributes of the left eye 300.

FIG. 5a depicts an embodiment of the electronic newsgathering system based on a contact-lens camera system where light rays 110 to 120 are diverted to scene camera 130 as before, but additionally there is a second camera 530 which is aimed, by way of the diverter, at the eye, such that it captures an image from the eye location as a reflection of the scene in a mirrored contact lens 540. For example, ray 120 is reflected off the mirrored contact lens as ray 520, entering camera 530. The contact lens acts as a curved mirror to provide a reflected image. Distortion is corrected by camera optics in camera 530, or by processor and combiner 560.

The contact lens camera provides an image of the subject matter in view of the eye, wherein the image is responsive to the gaze of the eye. For example, the contact lens provides a limited field of view, with emphasis to subject matter twice as off-axis as where the eye is looking. When the eye looks to the right, the contact lens moves with it, so subject matter to the right is imaged, and rays, such as ray 110 coming from the left do not hit the mirrored contact lens and are thus reflected weakly. The weak reflection of ray 110 is denoted as dashed line 510. Accordingly, processor 560 can calculate the gaze pattern by way of comparison of the two images, such that comparison of the two images results in an eye-tracker. Other embodiments include different kinds of special contact lenses that assist in the user-interface between the apparatus of the invention and the operator.

FIG. 5b denotes a display based on a contact lens. A special contact lens is made wherein there is a central portion 542 which has special optical properties, allowing the wearer to see or experience a display, and there is an outer portion 543 which allows the wearer to see normally, by seeing around the special portion 542. Owing to the natural opening and closing of the eye's own iris, the display will become more dominant when the iris closes in bright light. Thus a dim display will still be visible in bright light. Conversely, when the eye's own iris opens in dim light, the display will have a lesser degradation on the wearer's natural non-display view of the world. Likewise dilation of pupils which is a natural reflex action in dangerous situations will have the effect of bypassing a good part of the display.

Rays of light 545 passing through the center of the contact lens will be affected by special portion 542, resulting in altered rays 546. Rays of light 567 not passing through this central region but still entering the lens of eye 500 will not be affected, so they will enter as if the special contact lens were absent from the eye 500.

In some embodiments of the invention, the central portion 542 of the contact lens consists of nothing more than a small magnifying lens of focal length approximately 2 centimeters, and the contact lens is used together with special eyeglasses having a spatial light modulator (SLM) imbedded within the glass, directly in front of the eye. In such embodiments, the magnifying lens allows the wearer to read text and examine image material presented by the SLM inside the glass of the eyeglass lens. Covert versions can easily be built having the appearance of ordinary eyeglasses, wherein there is an eyetap camera in the opposite eye, which feeds the contact lens display.

In other embodiments, the central portion 542 is a diffraction grating which causes there to appear a reticle, graticule, or similar aiming aid. The diffraction grating is driven by a small laser concealed in other wearable items such as eyeglasses or a hat.

Another embodiment of the contact lens display makes use of markings within the contact lens itself. These are typically four "L" shaped corner marks. Alternatively, two bracket marks can be used, to denote the left and right edges of the picture boundary. When such markings are driven (illuminated) by a point source outside the contact lens (e.g. in a hat or in eyeglasses), a strong lens is also placed over the markings so that they will be seen as sharply defined markings in an out-of-focus circle of confusion caused by the eye's inability to focus on such a strong lens. In this case, the focal length of the lens is not particularly critical, so long as it creates an out-of-focus condition. Accordingly, it should have focal length shorter than about 3 to 5 centimeters. For example, a lens of focal length equal to 2 or 3 millimeters will ensure that a point source a centimeters away or further will be out of focus. The lens may also have negative focal length in order to make the point source appear out-of-focus.

Alternatively, one or more laser diodes may be imbedded in the contact lens and driven inductively by a small coil located therein. The coil may either be out of focus because of contact with the eye and would not interfere with normal vision or it may be located beyond the iris opening of the eye. Since electrical power is conveyed to the lens anyway, it may be desirable to make use of the availability of this power by also including a spatial light modulator, also responsive to this electrical power source. A circuit in the contact lens may also multiplex power to different elements of the spatial light modulator in accordance with different attributes of a signal conveyed along with the electrical power source. In this way a crude but useful viewfinder with variable graphics display may be implemented.

The effect of such a contact lens is to provide markings superimposed upon the real world. Such markings give the wearer a sense of photographic composition and scale. Even when a photojournalist is not shooting pictures or video, the contact lens of the invention may be useful in "sizing up" the scene, and in helping the journalist see the world with a "photographic eye". In particular, by constantly viewing the world through markings, a graticule, reticule, or the like, the wearer experiences a heightened sense of awareness of photographic composition. A clock, or other very simple but useful indicator may also be incorporated into the contact lens, by fitting the central portion with liquid crystal elements, each responsive to different signals received by the coil.

FIG. 6 depicts an image authentication aspect of the electronic newsgathering system. Inside the wearer's body 600 there is implanted a computer 610 which is powered remotely (preferably through inductive coupling) by way of a wearable newsgathering system 620. There is between the wearable unit 620 and the implantable computer 610 a cryptographic protocol wherein images acquired are watermarked as having been captured by the wearer 600. Moreover, in addition to the forensic value of the images or video so captured, there may also be provided a security system in which theft of apparatus 620 is discouraged by the fact that apparatus 620 requires implantable computer 610 to be in close proximity in order to operate. Whether this theft is because of the value of apparatus 620 itself, or the value of the data contained therein, the apparatus is still protected. For example, if user 600 removes clothing containing apparatus 620 in order to take a shower or the like, apparatus 620 will have little or no value to thieves. Moreover, apparatus 620 will be preferably designed so that there is a self destruction feature that will render data contained therein useless to one who attempts to force apparatus 620 open.

Implantable computer 610 may also be similarly protected from those who might try to murder wearer 600 and cut open his or her body to obtain implantable computer 610. Computer 610 may in fact be such that it senses vital signs and self destructs in their absence. Similar attempts to penetrate 610 may cause it to self destruct. Computer 610 may also contain a cryptographic protocol to protect it from being detected by unauthorized individuals who might, for example, attempt to use it to track the wereabouts of wearer 600.

FIG. 7 depicts a personal safety device in which cabling 710 encircles the wearer 600 of the apparatus. Cabling 710 is typically made of heavy security cable, which is similar to aircraft cable but designed so that it cannot be easily cut with bolt cutters, hacksaws, or the like. In this way, clothing incorporating cabling 710 cannot be easily removed by individuals who might attack the wearer 600. Cabling 710 is typically locked together by means that only the wearer can open. A remote escrow can also be used to protect the wearer from torture or other forms of forced disclosure of the unlocking means.

Should adversaries attempt to undress the wearer by drastic measures such as liquid nitrogen or acetylene cutting torches, once the circuit comprising cabling 710 is broken, thyristor 720 switches on by way of resistor 730 between its anode and gate. When thyristor (typically an SCR) 720 is turned on, current from high voltage power supply 740, and parallel capacitor 741 completely destroys apparatus 620.

Insofar as apparatus 620 might be or include a life-support system, or for other reasons that cutting through cabling 710 would result in death of the wearer, it is preferable that cabling 710 be sufficiently durable as to withstand most attempts to remove apparatus 620, and that cabling 710 be in two stages, a first stage of cutting through which activates a distress signal indicating an attempt to kill wearer 600. Chemicals, for example, a marker chemical such as that sold under the trade name Dye Witness™, are preferably automatically released, under extremely high pressure, by apparatus 620, at a first stage of attempted disrobing by assailants. In this way, the perpetrators of the attempted murder or similar crime will be identifiable, and will also be discouraged from cutting further through cabling 710 after knowing that they have already been so marked for identification. Moreover, the crime scene will be marked. Furthermore, very loud ear-piercing alarms may be activated, to scare off attackers or to interfere with their ability to continue with their criminal activity.

FIG. 8 depicts the system architecture in which camera 810 of eyewear 800 transmits through antenna 820 to remote site 830. At remote site 830, a collection of remote experts 840, some of which may be human experts (technicians, legal experts, scholars, etc.) and some of which may be computer agents or other kinds of computer programs. The experts at site 840 modify the images received from camera 810 and then send those images to transmitter 850 which is picked up by the eyewear receiver 870 and displayed on the head mounted display (HMD) aremac 870. Camera 810 and television (HMD) 870 are both typically housed in eyeglasses, and collectively, in the context of this entire system, allow the remote experts 840 to augment, diminish, or otherwise alter the visual perception of reality of the wearer of eyewear 800, and therefore establish not only a means by which images are transmitted from the wearer's camera 810 to one or more remote sites, but also allow the remote sites to communicate directly with the wearer by way of modifying the image stream. Typically the wearer might be a photojournalist or videographer, and simple examples of this modification of the image stream might include recognition of the identity of individuals in pictures sent by the journalist, and insertion of virtual name tags in the form of virtual text or graphics overlays upon the journalist's viewfinder aremac 870.

FIG. 9 depicts a system including a personal imaging computer in which some of the functionality embodied in the panel of remote experts 840 is instead embodied in a wearable system. In actual practice, the expertise may come from computer programs running on systems worn on the body of the journalist, from systems remotely accessed by the journalist, or from remote human intelligence. FIG. 9 is characterized by a computer 970 that operates constantly, but is configured so that it does not restrict the journalist 999 from doing other tasks. For example, computer 970 may include a camera which constantly takes in information 950, from the environment, and is thus constantly attentive to the environment even when it is not being explicitly used. Computer 970 might, for example, constantly compare incoming camera signals against a database of faces of people who the journalist might wish to interview, so that the journalist can recognize people he or she has never met before. This information from the camera may be observable by the journalist by way of a viewfinder which completes path 930 of information from computer 970 to journalist 999. With such a configuration, computer 970 may be interposed between the camera and aremac (viewfinder) of FIG. 1.

The unencumbering (unrestrictive) nature of the apparatus of the invention is expressed by signal flow 920 from the human, outward. Moreover, computer 970 is unmonopolizing of the journalist's attention, and is configured so that the journalist does not need to pay the level of attention to the computer that is typical of normal desktop or laptop computers. Preferably the journalist uses a reality-interface metaphor to the computer, so that information, for example, can appear where the journalist is already looking (such as at the person he or she is interviewing), rather than requiring undivided attention of the journalist as might be the case with a conventional graphical user interface found on most desktop computers. This signal flow 910 denotes input from the environment to the human (journalist). There is also signal flow 930 from the computer to the journalist and signal flow from the journalist to the computer 940. Since the computer 970 is constant in operation, at any time, it can respond to signal control 940, unlike a traditional laptop computer which must ordinarily first be turned on and booted before becoming responsive to input. Thus the system assists in being always ready to cover any newsworthy event that might happen without notice. Furthermore, since the computer 970 is always running, it is always taking in information 950 in the environment. For example, the system is always taking pictures and video whether or not there is a need for pictures or video. In this way, a retroactive record function may, for example, be implemented. Moreover, a remote (or local) expert might recognize someone of importance even if the journalist is not paying attention to his or her viewfinder.

Signal path 950 into the computer, and a signal path 960 out of the computer also include a high-speed communications link with other computers on the network, so that the computer is preferably online (CONNECTED) constantly.

The entire system is worn on the body of the journalist 999, within clothing 980, so that it is a personal effect of the journalist and is therefore also perceived by others as a personal effect of the journalist, rather than something that the journalist carries in a satchel or case. In this way, it is less likely that others will ask the journalist to leave the apparatus behind, since it would be unreasonable of someone to ask the journalist to leave his or her clothes behind. While a shopkeeper, for example, may ask a journalist to leave a bag or briefcase at the front counter of a department store, it is less likely that a shopkeeper would ask the journalist to undress and leave his or her clothing at the front counter.

FIG. 10 illustrates the covert typing and data-entry device which may be used to achieve signal flow 940 (that the computer is CONTROLLABLE) of FIG. 9. Spring-loaded rocker switches 1010 function as both momentary and latching switches, while pushbutton switches 1020 function as momentary-only switches. Belt mounted switches 1010 and 1020 are connected to the computer by connector 1030. The belt may be concealed under a heavy sweater or jacket, and permits control of the body-worn computer system, such as may be desired to covertly type a query to a remote expert while conducting an investigative interview. In this way, rather than having to call for remote advice by telephone, little or no sound is made in this process, and it is not as easily for others to eavesdrop on this virtual conversation, as might be facilitated by the UNIX "talk" command or the like.

FIG. 11 depicts a computer-mediated reality as seen from the perspective of the journalist. This figure depicts three frames of a video sequence taken from the journalist's viewfinder. The journalist, doing a story on the honesty of cashiers in explaining refund policies, looks at a cashier 1110 in a department store. The viewfinder of the system of FIG. 9 provides the journalist with additional information in the form of an overlay 1120. As the journalist turns his head to the right, the cashier 1130 moves to the left in the viewfinder, as we normally expect when looking through a viewfinder. However, computer 970 of FIG. 9 provides extra information 1140 to the journalist, which moves with the cashier, so that computer 970 sustains the illusion of a rigid planar patch. In this way, the real and virtual objects remain connected. Even when the cashier 1150 begins to fall off the left side of the viewfinder as when the journalist turns his head so far to the right as to no longer be able to see the cashier's face, the extra information 1160 is still, in part, visible, and the illusion of attachment is sustained. This is an example of a reality-user interface that does not require that the journalist pay full attention to the computer task.

FIG. 12 depicts an application in which the end-user uses the system of FIG. 9 to read a newspaper, or in which content producers can collaborate in a shared virtual space.

Referencing FIG. 9 and FIG. 12, as the user walks down corridor 1210, a virtual newspaper is displayed on wall 1220 by computer 970. The newspaper is presented to the reader in a way that it appears to be a rigid planar patch attached to the wall 1220 of corridor 1210. In this way a journalist can write a story upon the walls of the corridor, and others who wear the appropriate apparatus can read the story. This may allow, for example, the journalist to write a story about this very corridor, and place it in the corridor for reading, so that those reading the story may, for example, re-live an experience as a virtual past. Alternatively, it allows journalists to work together in a virtual space to leave messages for each other. For example, a person who was physically assaulted and unlawfully detained for having taken a picture in a Shell™ gas station variety store on Spadina Avenue in Toronto, could leave a virtual message to other users of the apparatus, warning them of illegal and potentially dangerous past activity of a particular Shell gas station employee.

There have been many situations in which owners of shops and other establishments have committed crimes, such as the murder of Latasha Harlins who was falsely accused of shoplifting and fatally shot in the back by a shopkeeper. Thus it is preferable that these shop owners not have a monopoly on video surveillance.

In addition to shops and other organizations using their own video surveillance networks for the purposes of stalking and attacking people entering their organization, there is the problem that these perpetrators may attempt to committ undocumented crimes by avoiding their own surveillance network, or erasing data therein.

Thus the utility and value of an intelligence collective of citizens, photojournalists, and the like, living in a shared computer mediated reality environment, is quite evident, especially when members of the collective may post virtual warning messages, danger signs, and the like, that owners of establishments would not ordinarily wish be seen or known. When citizens do not own the physical space, they may not put real markings and real signs up. Hence the value of a system such as that depicted in FIG. 12 in which citizens, journalists, etc., may post virtual notices within business establishments and dangerous places is quite evident.

BENEFITS OF THE INVENTION

The present invention allows the journalist to experience the camera over a long period of time. For example, after wearing the apparatus all day for several weeks, it begins to function as a true extension of the mind and body. In this way, photographic composition is much more optimal, because the act of taking pictures or shooting video no longer requires conscious thought or effort. Moreover, the intentionality of the picture-taking process is not evident to others, because picture-taking is not preceded by a gesture such as holding a viewfinder object up to the eye. The wearable viewfinder is an important element of the wearable camera invention allowing the journalist to experience everyday life through a screen, and therefore be always ready to capture anything that might happen, or even anything that might have happened previously by virtue of the retroactive record capability of the invention. Moreover, additional information beyond just exposure and shutter speed may be displayed in the camera viewfinder. For example, the camera allows the journalist to augment, diminish, or otherwise alter his or her perception of visual reality. This mediated-reality experience may be shared. The journalist may allow others to alter his or her perception of reality. In this way the invention is useful as a new communications medium, in the context of collaborative photojournalism, collaborative videography, and telepresence for intelligence augmentation for purposes of conducting an interview.

The apparatus of the invention captures a natural first-person perspective, and allows the user to take better pictures or video, especially in embodiments in which both eyes are effectively co-located. Some embodiments also provide for improved security and personal safety, as well as for forensic aspects of the pictures or video captured.

OTHER EMBODIMENTS

From the foregoing description, it will thus be evident that the present invention provides a design for a wearable camera with viewfinder means. As various changes can be made in the above embodiments and operating methods without departing from the spirit or scope of the following claims, it is intended that all matter contained in the above description or shown in the accompanying drawings should be interpreted as illustrative and not in a limiting sense.

Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

I claim:

1. A portable electronic camera device including an electronic camera and an electronic display, said electronic display responsive to an output from said electronic camera, said electronic display being, in use, viewable by an eye of a user of said portable electronic camera device, and reflective optics arranged for reflecting light such that at least a portion of a first set of converging rays of light which would, absent said reflective optics, converge at said eye is reflected to a second set of converging rays directed at the center of projection of said camera, wherein said reflective optics is further for reflecting light from said electronic display such that said reflected light from said electronic display forms a third set of converging rays approximating said first set of converging rays, in order to provide substantial exact registration of what would have been seen by said eye, in the absence of said portable electronic camera device, with what, in the presence of said portable electronic camera device, is seen at said eye.

2. The camera device as described in claim 1, where at least a portion of said camera device is wearable.

3. The camera device as described in claim 2, where said electronic display is visible to said eye, and subtends a visual field of view that is equal to the visual field of view of said electronic camera.

4. The camera device as described in claim 2, where said electronic display is an aremac, and where a given ray of light from said aremac is an output ray, said output ray being from an element of said aremac primarily responsive to a corresponding element of said camera that is primarily responsive to a particular input ray of light, said output ray and said input ray being approximately collinear.

5. The camera device as described in claim 2, wherein said third set of converging rays converge at a point which, in use, is at said eye and wherein said electronic camera is a real camera responsive to real rays of light going towards said point and collinear with lines passing through said point, and further including a virtual camera, said virtual camera responsive to virtual rays of light going away from said point and collinear with lines passing through said point.

6. The camera device as described in claim 5, where said virtual camera is responsive to at least one aspect of an eye of a wearer of said camera device.

7. The camera device as described in claim 6, where said at least one aspect includes the direction of gaze of said eye.

8. The camera device as described in claim 6, further comprising a wearable processor responsive to an output of said real camera and responsive to an output of said virtual camera and where said at least one aspect includes the amount of pupil dilation of said eye, where said wearable processor determines from said electronic camera an amount of light present in subject matter in view of said eye, and where said virtual camera is responsive to pupil dilation, such that pupil dilation in excess of that which would normally accompany said amount of light present, causes images to be captured, stored, or transmitted at greater frequency, or flagged as images having greater importance than would be the case with pupil dilation not in excess of that which would normally accompany said amount of light present.

9. The camera device as described in claim 5, where said virtual camera is responsive to at least one identifying attribute of an eye of a wear of said camera device.

10. The camera device as described in claim 5, where said virtual camera is a virtual retinal camera.

11. The camera device as described in claim 1, where said eye is a first eye, and where said electronic display is arranged so as to be observable by a second eye of a wearer of said camera device.

12. The camera device as described in claim 11, where said electronic display subtends the same angle of field of view as the angle of field of view of said electronic camera.

13. The camera device as described in claim 11, where said electronic display is arranged so as not to be seen by said first eye.

14. The camera device as described in claim 13, where at least an active portion of said electronic display and at least a sensor array of said electronic camera are both mounted in a rotatable housing, so that they can both be rotated together in unison.

15. The camera device as described in claim 14, where said rotatable housing is a first housing, where said first housing is mounted inside a second housing, said second housing being wearable, and said first housing being rotatable around an axis of rotation parallel to a line going through both eyes of a wearer of said second housing.

16. The camera device as described in claim 13, where said electronic display is part of a device comprising a scanner displaying display information to said second eye and also deriving derived information from said second eye, said derived information being conveyed to said wearable processor, along with picture information from light diverted from said first eye, and further including a processor responsive to attributes of said second eye and a scene in view of said first eye.

17. The camera device as described in claim 2, housed within a unit that also functions as a telephone, and said telephone providing means of wirelessly sending pictures acquired by said electronic camera to a remote location.

18. The camera device as described in claim 17, said telephone including two folding and unfolding arms, one of which is a mouthpiece, and another of which is an eyepiece, and further including a main body to be held over an ear of said user, and where said mouthpiece flips out over said user's mouth, as with a conventional folding cellular telephone, and where said third arm flips out over an eye of said user of said telephone, said eyepiece containing said electronic camera and said aremac.

19. The camera device as described in claim 2, further including a bidirectional data communications link to at least one remote site, said bidirectional data communications link providing means for images to be simultaneously sent from said electronic camera to said at least one remote site and also further including means for images to be received from said at least one remote site and displayed to said user by way of said aremac.

20. The system as described in claim 19, further including image processing means for images received at said remote site, to produce modified images at said remote site, and means of sending said modified images from said remote site to said electronic display.

21. The camera device as described in claim 1, where said camera device may be held up to a face of said user where said eye is a first eye, and where said electronic display is arranged so as to be observable by a second eye of said user when said camera device is held up to both eyes of said user, and where said electronic display is arranged so as not to be seen by said first eye when said device is held up to both eyes of said user.

22. The camera device as described in claim 1, where said electronic camera is a scene camera, and further including a contact lens camera, said contact lens camera comprising:

a second camera;
optics comprising a mirrored or reflective contact lens, said optics providing said second camera with a reflected view of subject matter in view of an eye of a wearer of said mirrored or reflective contact lens.

23. The camera device as described in claim 1, further including a contact-lens to be worn on said eye, said contact lens comprising:

a central portion, said central portion having at least one of:
a lens of focal length less than 3 centimeters;
a diffraction grating embedded within said contact-lens;
a lens of focal length less than 5 centimeters, said lens containing markings;
an inductive pickup coil around the periphery of said contact-lens and a light source responsive to said inductive pickup coil,
a peripheral portion, said peripheral portion not appreciably affecting rays of light passing through it.

24. The camera device as described in claim 1, further including a contact-lens to be worn on said eye, said contact lens comprising:

an inductive pickup coil around the periphery of said contact-lens;
a light source responsive to said inductive pickup coil;
a spatial light modulator, said spatial light modulator embedded in said contact-lens between an eye of a wearer of said contact-lens and said light source, said spatial light modulator responsive to said inductive pickup coil.

25. A personal safety device, including the camera device described in claim 1, further including an implantable computer, implanted within said user's body, said implantable computer deriving its power source from said camera device, where said camera device is not implanted within said user's body, said implantable computer having a bidirectional data communications link with said camera device, said camera device including means for providing at least one of the following functions:

becoming inoperable without being in close proximity to said implantable computer;
self-destruction if separated from said implantable computer in an unauthorized manner;
erasure of at least some of the data contained therein if separated from said implantable computer in an unathorized manner.

26. The camera device as described in claim 1, further including a strong conductive cable incorporated in clothing, and further including control circuits responsive to electricity flowing through said strong conductive cable, such that severing said strong conductive cable will result in at least one of the following:

self-destruction of at least some portions of said camera device;
erasure of at least some of the data contained within said camera device;
release of chemicals which can be used to aid in the capture of perpetrators of a crime.

27. The camera device as described in claim 1, housed within a unit that also functions as a telephone, and said telephone providing means of wirelessly sending pictures acquired by said electronic camera to a remote location.

28. The camera device as described in claim 1 further including a wireless communications link to at least one remote site.

29. The camera device as described in claim 28, where said wireless communications link is a video communications link.

30. The camera device as described in claim 29, said video communications link providing means for sending images from said electronic camera to at least one remote site.

31. The camera device as described in claim 1 further including a wireless communications link to at least one remote computer.

32. A personal imaging system including the camera device of claim 1 further comprising image capture means, where an image produced by said image capture means is responsive to subject matter in front of a user of said personal imaging system, and where said image is also responsive to an attribute of an eye of said user, said personal imaging system being worn by said user such that it may be aimed at said subject matter without use of a hand of said user to hold said personal imaging system.

33. A personal imaging system, as described in claim 32, where said image is responsive to an attribute which is sufficient to uniquely identify said user.

34. A personal imaging system including the camera device of claim 1 and further comprising a light-tight housing containing a sensor array and having a first opening to admit light from subject matter and a second opening for an eye opposite said first opening, such that light passing through said first opening emerges through said second opening and passes into said eye, and then said light emerges from said eye and enters said second opening and then forms an image responsive to said eye and said subject matter.

35. A personal imaging system including the camera device of claim 1 and comprising at least one camera display, and optics arranged for producing two simultaneous pictures comprising a first picture of subject matter in front of a user of said personal imaging system, and a second picture of an aspect of an eye of said user.

36. A hand-held device said hand-held device including the camera device of claim 1 and including an opening for an eye, and means for capture of at least one picture responsive to rays of light coming toward a point approximately located at the center of a lens of said eye, such that during capture of said at least one picture by said means for capture, said eye is afforded with a natural undistorted view of the same rays of light to which said picture is responsive, and in which said eye is also afforded with means of determining the spatial extent of said picture.

37. A hand-held device as described in claim 36, where said hand-held device further includes the functionality of a telephone, operable while holding said opening to said eye.

38. A personal camera system including the camera device of claim 1 and further comprising:
 a first camera and optics arranged for imaging light collinear with light entering an eye of a user;
 a second camera and optics arranged for receiving light reflected from one of:
  (a) an internal feature of said eye; and
  (b) a contact lens worn by said eye.

39. The camera system of claim 38 further comprising said contact lens and wherein said second camera and optics is arranged for receiving light reflected from said contact lens when worn by said eye of said user and wherein said contact lens includes a reflective feature whereby a position of said contact lens, and therefore said eye, may be determined by a position of said feature.

40. The camera system of claim 38 including a source of light for illuminating said eye.

41. The camera system of claim 38 further comprising said contact lens and a display wherein said second camera and optics is arranged for receiving light reflected from said contact lens when worn by said eye and wherein said contact lens includes a first portion with a different magnification than a second, remaining, portion of said contact lens, said first portion for imaging onto a retina of said eye.

42. The portable electronic camera device of claim 1, further comprising a processor or computer, said electronic display being responsive to an output of said processor or computer, said processor or computer being responsive to said electronic camera.

43. The portable electronic camera device as described in claim 1, further including a processor or computer, where said electronic display may be made responsive to an output of said processor or computer, and where said processor or computer is responsive to said electronic camera.

* * * * *